(12) United States Patent
Mori et al.

(10) Patent No.: US 10,542,171 B2
(45) Date of Patent: Jan. 21, 2020

(54) INFORMATION PROCESSING APPARATUS, METHOD OF CONTROLLING THE SAME, AND STORAGE MEDIUM FOR SETTING A NAMING RULE FOR A FILE NAME

(71) Applicant: CANON KABUSHIKI KAISHA, Tokyo (JP)

(72) Inventors: Ryuta Mori, Nagareyama (JP); Makiya Tamura, Tokyo (JP); Daijiro Miyamoto, Kawasaki (JP); Natsuki Kato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/899,862

(22) Filed: Feb. 20, 2018

(65) Prior Publication Data

US 2018/0176405 A1 Jun. 21, 2018

Related U.S. Application Data

(63) Continuation of application No. 14/830,824, filed on Aug. 20, 2015, now Pat. No. 9,924,060.

(30) Foreign Application Priority Data

Aug. 28, 2014 (JP) .................................. 2014-174285

(51) Int. Cl.
*G06F 3/048* (2013.01)
*H04N 1/00* (2006.01)
*H04N 1/32* (2006.01)

(52) U.S. Cl.
CPC ....... *H04N 1/00925* (2013.01); *H04N 1/0048* (2013.01); *H04N 1/00244* (2013.01);
(Continued)

(58) Field of Classification Search
CPC ............ H04N 1/00411; H04N 1/0048; H04N 1/00925
(Continued)

(56) References Cited

U.S. PATENT DOCUMENTS 9,128,650 B2 9/2015 Mori
9,413,841 B2 8/2016 Tamura
(Continued)

FOREIGN PATENT DOCUMENTS

JP H06152818 A 5/1994
JP 2002-064534 A 2/2002
(Continued)

OTHER PUBLICATIONS

Notification of Reasons for Refusal issued by the Japanese Patent Office dated Mar. 29, 2019 in corresponding Japanese Patent Application No. 2018-035370, with English translation.

*Primary Examiner* — Jamares Q Washington
(74) *Attorney, Agent, or Firm* — Carter, DeLuca & Farrell LLP

(57) ABSTRACT

There is provided with an information processing apparatus and a method of controlling the same. The apparatus sets a naming rule for an image file and determines whether or not the set naming rule satisfies a predetermined condition. If it is determined that the naming rule does not satisfy the predetermined condition, the information processing apparatus warns a user. On the other hand, if it is determined that the naming rule satisfies the predetermined condition, the information processing apparatus generates a file name of the image file in accordance with the set naming rule, and stores the image file with the file name.

20 Claims, 16 Drawing Sheets

(52) U.S. Cl.
CPC ..... *H04N 1/00411* (2013.01); *H04N 1/32117* (2013.01); *H04N 2201/0094* (2013.01); *H04N 2201/3233* (2013.01)

(58) Field of Classification Search
USPC .......... 358/1.9, 1.6, 2.1, 3.24, 403; 715/739, 715/810
See application file for complete search history.

(56) References Cited

U.S. PATENT DOCUMENTS

| | | |
|---|---|---|
| 9,924,060 B2 | 3/2018 | Mori et al. |
| 2006/0174054 A1* | 8/2006 | Matsuki ................ G06F 3/0482 711/100 |
| 2008/0117472 A1 | 5/2008 | Nohtomi |
| 2010/0053667 A1 | 3/2010 | Honda |
| 2011/0157420 A1* | 6/2011 | Bos ....................... G10L 15/265 348/231.2 |
| 2014/0122479 A1* | 5/2014 | Panferov ............ G06K 9/00469 707/736 |

FOREIGN PATENT DOCUMENTS

| | | | |
|---|---|---|---|
| JP | 2007249613 A | 9/2007 | |
| JP | 2007317096 A | 12/2007 | |

* cited by examiner

| | DESTINATION ID | REGISTERED NAME | TELEPHONE NUMBER | DESTINATION TABLE NAME |
|---|---|---|---|---|
| 604 | 00100 | ABC CO. | 0334344545 | MR. A |
| 605 | 00101 | Zmarketing | 0343295054 | MR. B |
| 606 | 00102 | K CO. | 0385498854 | MR. C |
| | ... | ... | ... | |

```
701 — hostname,sharedserver
702 — folderpath,root/
703 — username,administrator
704 — password,32942xc45
705 — filenamerule,[REGISTEREDNAME]_[FAXNUMBER]_[DATE]
706 — foldernamerule,[REGISTEREDNAME]/[FAXNUMBER]/[DATE]
```

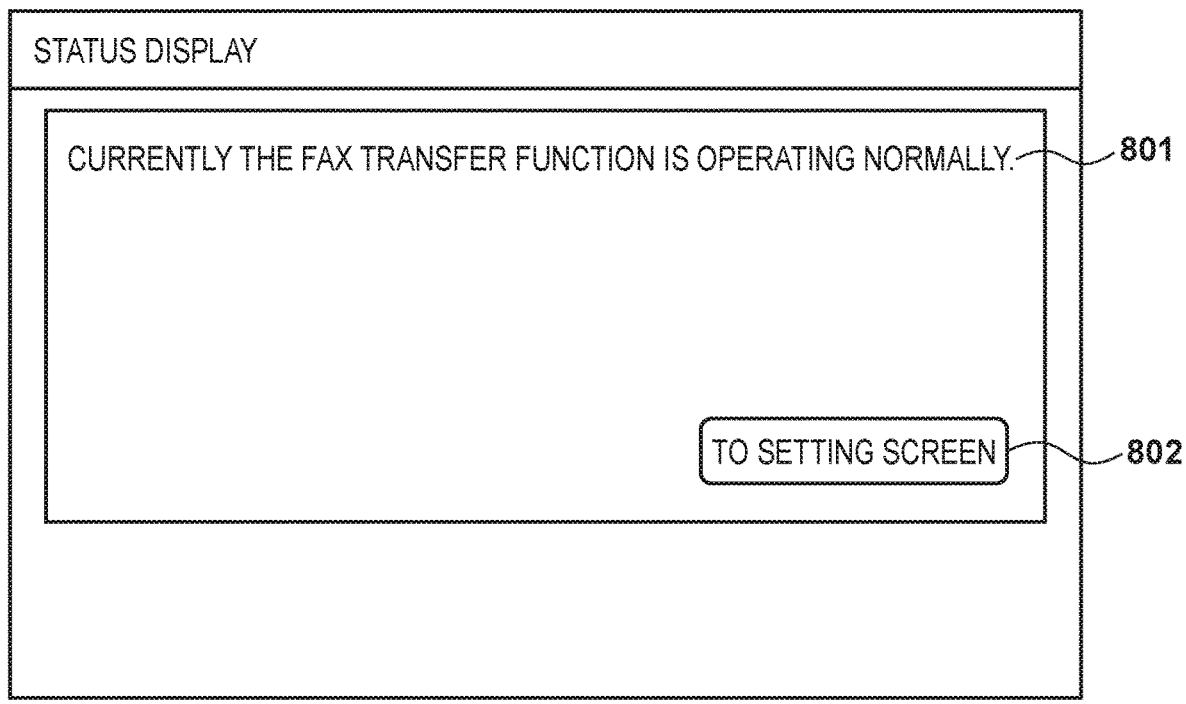

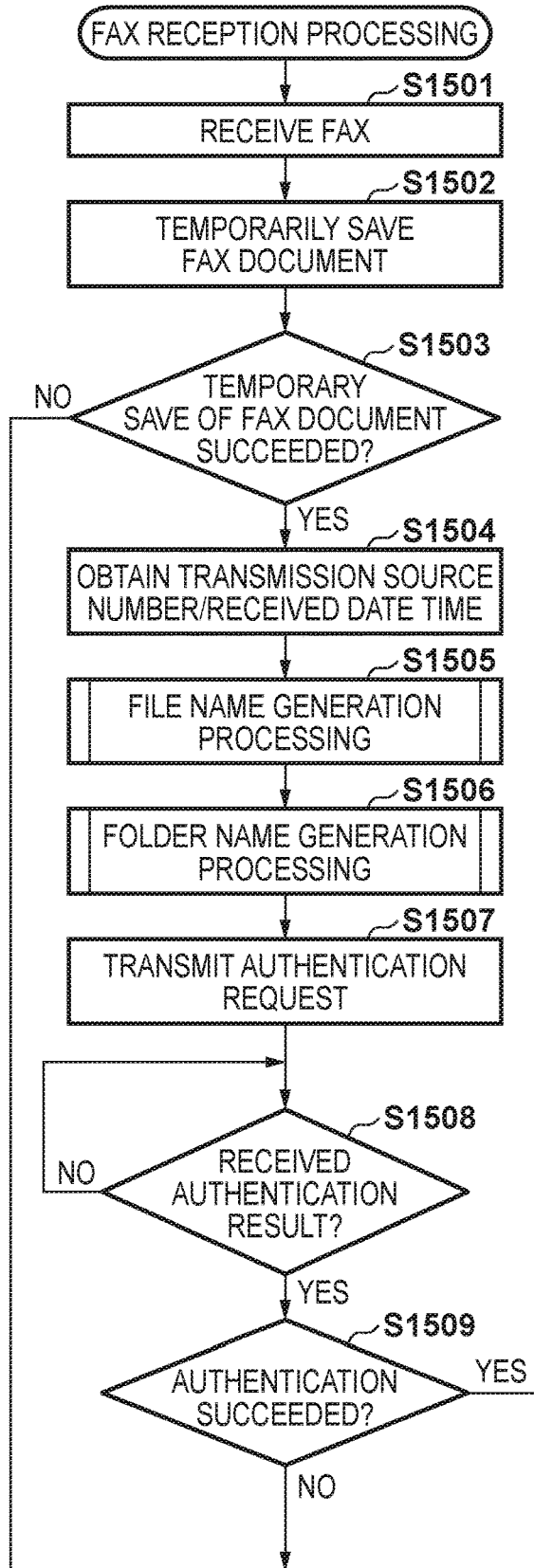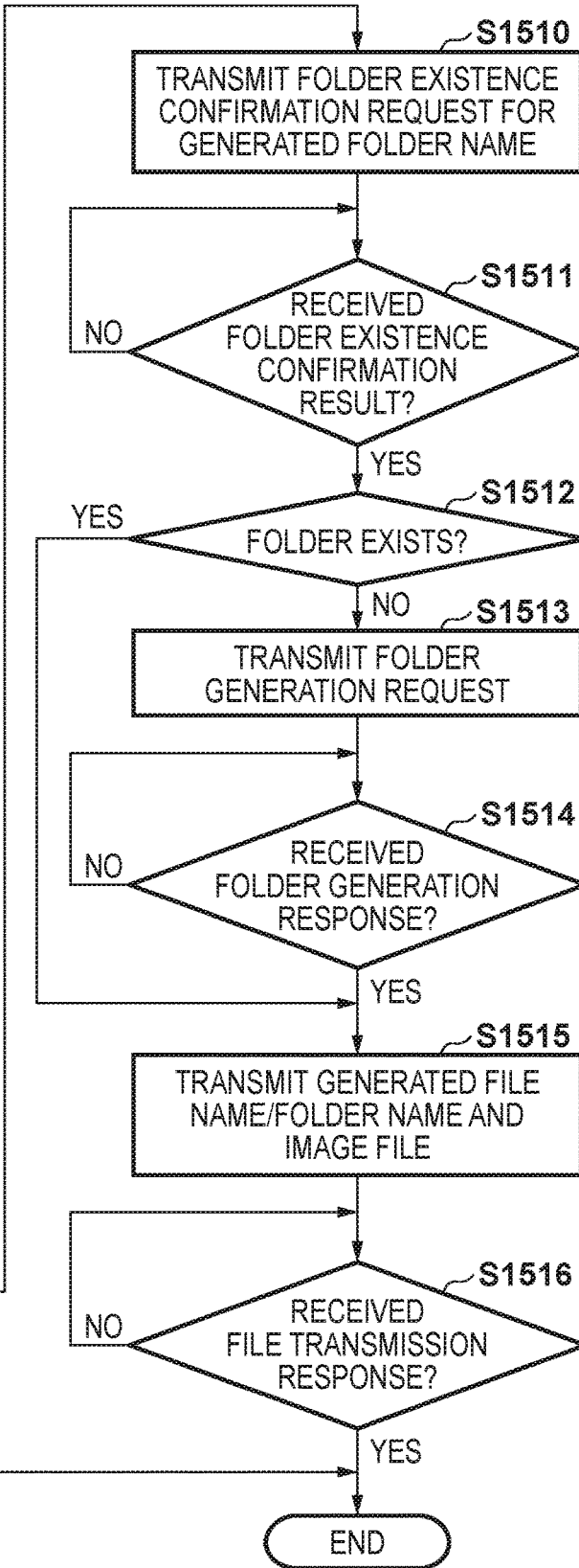
FIG. 15

2101 — hostname,sharedserver
2102 — folderpath,root/
2103 — username,administrator
2104 — password,32942xc45
2105 — filenamerule,[REGISTEREDNAME]_[FAXNUMBER]_[DATE]
2106 — foldernamerule, [REGISTEREDNAME]/[FAXNUMBER]/[DATE]
2107 — dialogrule,[REGISTEREDNAME], [FAXNUMBER]

F I G. 22

| FOLDER NAMING RULE SETTINGS |
|---|

2201 ☑ [REGISTERED NAME]/[FAX NUMBER]/[DATE]

2202 ☐ [DATE]/[REGISTERED NAME]/[FAX NUMBER]

2203 ☐ [FAX NUMBER]/[REGISTERED NAME]/[DATE]

| CANCEL | RETURN | NEXT |
| --- | --- | --- |
| 2204 | 2205 | 2206 |

INFORMATION PROCESSING APPARATUS, METHOD OF CONTROLLING THE SAME, AND STORAGE MEDIUM FOR SETTING A NAMING RULE FOR A FILE NAME

CROSS REFERENCE TO RELATED APPLICATIONS

This application is a continuation of U.S. patent application Ser. No. 14/830,824 filed on Aug. 20, 2015, which claims the benefit of and priority from Japanese Patent Application No. 2014-174285, filed on Aug. 28, 2014, the disclosures of each of which are hereby incorporated by reference herein in their entirety.

BACKGROUND OF THE INVENTION

Field of the Invention

The present invention is related to an information processing apparatus, a method of controlling the same, and a storage medium.

Description of the Related Art

In a service using a fax, digitization of a fax document received by an MFP or by fax is performed using a scan function of the MFP or a scanner, and the fax document is stored on a file server, or the like. The MFP is an abbreviation of Multi Function Peripheral, and one example of this is an image forming apparatus having a plurality of functions such as those for a copying machine, a scanner, and a fax. In such a case, in order to allow for optimization of digitization and file server storing work, a received facsimile transfer system is constructed to digitize a fax document, and automatically store the document to a file server in accordance with attributes of the fax document. In this kind of system, a file name of a fax document that is received is generated in accordance with a telephone number of a transmission source of the fax document, and other attribute information, and the fax document is stored to the file server. Here, if the file name is duplicated, a new fax document will overwrite an existing fax document, and so there is the possibility of a fax document that was stored disappearing.

According to Japanese Patent Laid-Open No. 2002-64534, for example, a technique of storing a fax document that the FAX server received, adding a unique identification number as the file name, is recited as a strategy for handling this kind of disappearance of a fax document that is stored. If this technique is employed, an identification number specific to a communication network, or an identification number specific within a FAX server is used as the file name of the fax document, and thereby a unique file name can be generated, and data loss due to duplication of the file name can be prevented.

However, with the technique recited in the above-described Japanese Patent Laid-Open No. 2002-64534, because the system side forcibly adds the unique identification number as the file name, the visibility of the user deteriorates. For this reason, there is the problem that when a user uses a fax document that is stored, it is difficult to identify a desired fax document, and the effort in searching for a desired document is cumbersome.

SUMMARY OF THE INVENTION

An aspect of the present invention is to eliminate the above-mentioned problems with conventional technology.

A feature of the present invention is to provide a technique by which it is possible to set so that a file name of an image file becomes unique, and so that a visibility for a user is enhanced.

According to a first aspect of the present invention, there is provided an information processing apparatus, comprising: a first setting unit configured to set a naming rule for an image file; a determination unit configured to determine whether or not the naming rule set by the first setting unit satisfies a predetermined condition; a warning unit configured to warn a user if it is determined by the determination unit that the naming rule does not satisfy the predetermined condition; and a control unit configured to control so as to, if it is determined by the determination unit that the naming rule satisfies the predetermined condition, generate a file name of the image file in accordance with the naming rule set by the first setting unit, and store the image file.

According to a second aspect of the present invention, there is provided a method of controlling an information processing apparatus operable to store an image file, the method comprising: setting a naming rule for an image file; determining whether or not the naming rule set in the setting satisfies a predetermined condition; warning a user if it is determined in the determining that the naming rule does not satisfy the predetermined condition; and controlling so as to, if it is determined in the determining that the naming rule satisfies the predetermined condition, generate a file name of the image file in accordance with the naming rule set in the setting, and store the image file.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 depicts a view illustrating an example of a status display screen displayed on a console unit of the MFP according to the first embodiment.

FIG. 9 depicts a view illustrating an example of a file server setting screen that the MFP according to the first embodiment displays.

FIG. 15 is a flowchart for describing fax reception processing by the MFP according to the first embodiment.

FIG. 22 depicts a view illustrating an example of a folder naming rule setting screen displayed by the MFP according to a third embodiment of the present invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Firstly, explanation will be given for a first embodiment according to the present invention. In the first embodiment, explanation is given for an example of an MFP (multi-function peripheral) which is an example of an image forming apparatus of the present invention, and fax document transfer setting processing, fax reception processing, and file transfer processing in a system including a file server having a file storage function.

Figure 1:
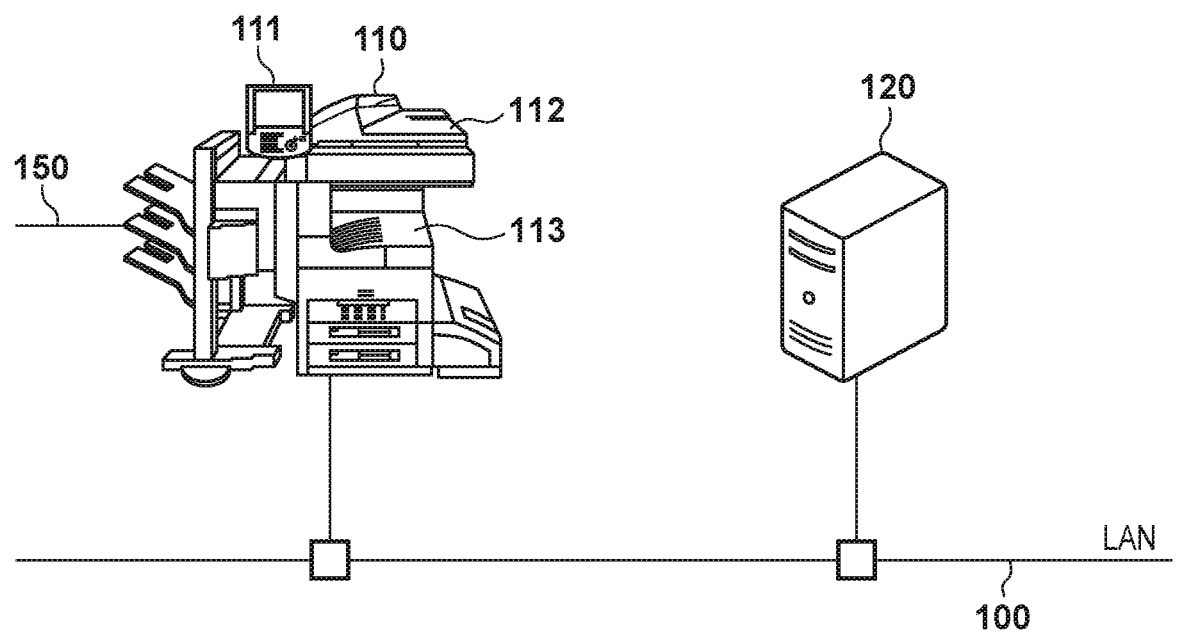
FIG. 1 depicts a view illustrating an example of an information processing system according to a first embodiment of the present invention.

FIG. 1 depicts a view illustrating an overall configuration of an information processing system according to a first embodiment of the present invention.

In this information processing system, an MFP 110 and a file server 120 are connected via a LAN 100.

The MFP 110 is a multi-function peripheral (a multifunction processing apparatus) having a console unit 111, a scanner unit 112, and a printer unit 113, and the MFP 110 is connected to a telephone public circuit network 150 and can receive facsimiles. In the information processing system according to the first embodiment, the MFP 110 is used as a receiving terminal for fax documents. The file server 120 performs authentication of connecting terminals, and stores and manages received files under a designated file name and folder name. However, the system according to the first embodiment is not limited to the number of devices configured in FIG. 1. For example, by having the function of the file server within the MFP 110, the MFP and the file server may be configured in the same apparatus. Also, the file server may be configured as a server on the Internet, or as a cloud system.

Figure 2:
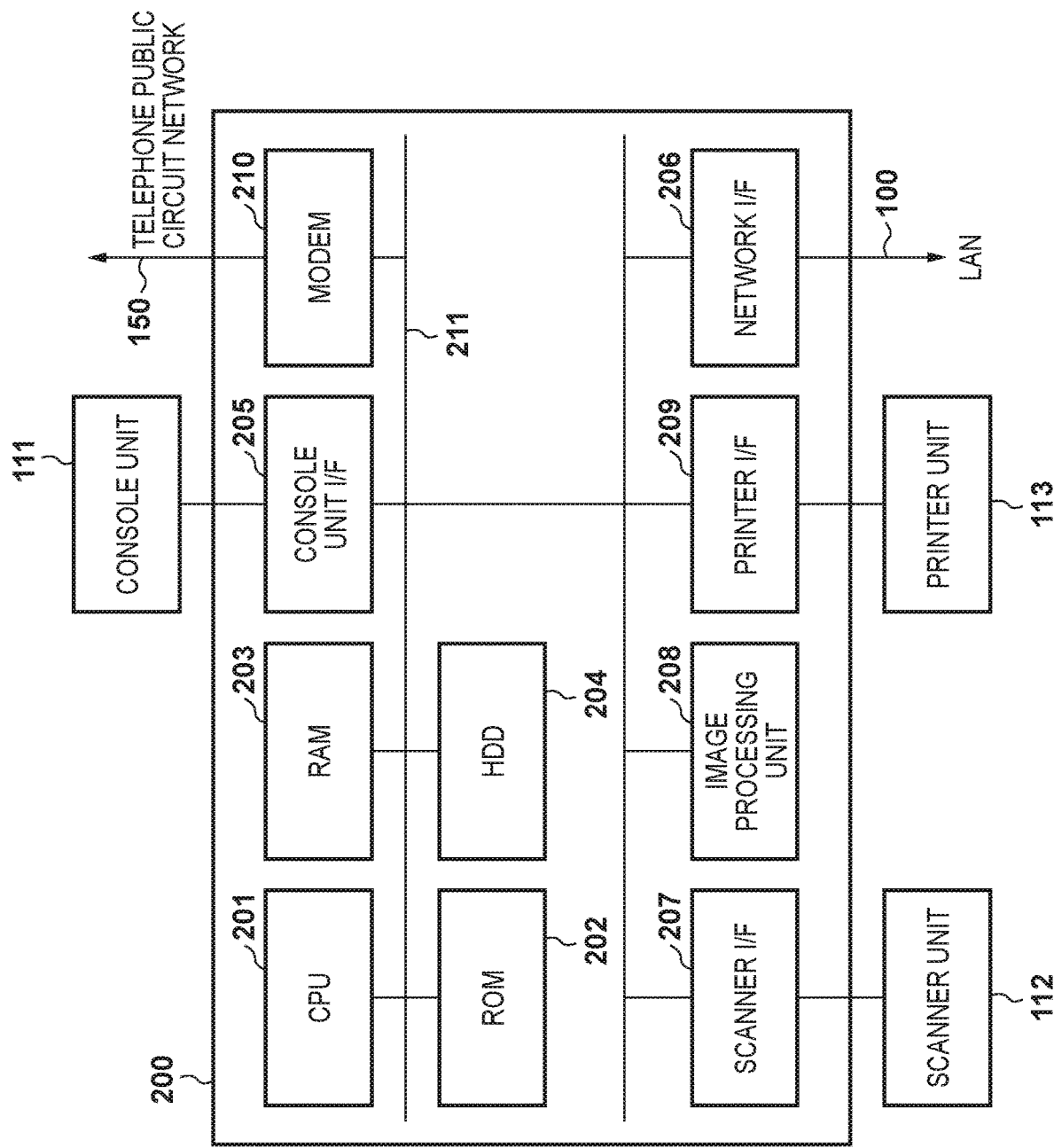
FIG. 2 is a block diagram for explaining a hardware configuration of an MFP according to the first embodiment.

FIG. 2 is a block diagram for explaining a hardware configuration of the MFP 110 according to the first embodiment.

The console unit 111 has a display unit having a touch panel function, various hard keys, or the like, and the console unit 111 displays information to users in accordance with data from a control unit 200, and inputs information into the control unit 200 in accordance with operation of a user. The scanner unit 112 reads images of originals, generates image data for the images, and supplies the image data to the control unit 200. The printer unit 113 prints images onto sheet (sheets of paper, etc.) based on the image data received from the control unit 200.

The control unit 200 is connecting electrically to the console unit 111, the scanner unit 112, and the printer unit 113, and is connected to the LAN 100 via a network interface (I/F) 206. With this, communication is possible by a communication protocol such as TCP/IP via the LAN 100. In the control unit 200, a CPU 201 is connected to a ROM 202, a RAM 203, an HDD 204, a console unit I/F 205, the network I/F 206, a scanner I/F 207, an image processing unit 208, and a printer I/F 209, through a system bus 211. The CPU 201 executes a boot program in the ROM 202, deploys an OS and control programs stored in the HDD 204 into the RAM 203, and controls the MFP 110 comprehensively in accordance with those programs. This control includes execution of programs for realizing the later described flowcharts. In the ROM 202, the boot program and various data of the MFP 110 are stored. The RAM 203 provides a work memory for the CPU 201 to operate, and provides an image memory for temporary storage of received image data, or the like. The HDD 204 is a hard disk drive, and stores an OS, various programs, and image data. The console unit I/F 205 is an interface unit for connecting the system bus 211 and the console unit 111. The network I/F 206 connects the LAN 100 and the system bus 211, and performs input/output of information via the network (LAN) 100. The scanner I/F 207 controls an interface between the scanner unit 112 and the control unit 200. The image processing unit 208 performs image processing such as rotation, color conversion, and image compression/decompression processing on image data input from the scanner unit 112, and image data output to the printer unit 113. The printer I/F 209 receives image data processed by the image processing unit 208, and controls printing by the printer unit 113 in accordance with attribute data attached to the image data. A modem 210 is connected to the telephone public circuit network 150 and the system bus 211, and performs transmitting/receiving of facsimiles with an external fax terminal (not shown) via the telephone public circuit network 150. Note that in the first embodiment, explanation is given for an example of the MFP 110, which is capable of a UI display using the console unit 111, but in place of the MFP 110, for example, an information processing apparatus such as a general-purpose computer, or some other image processing apparatus may be used.

Figure 3:
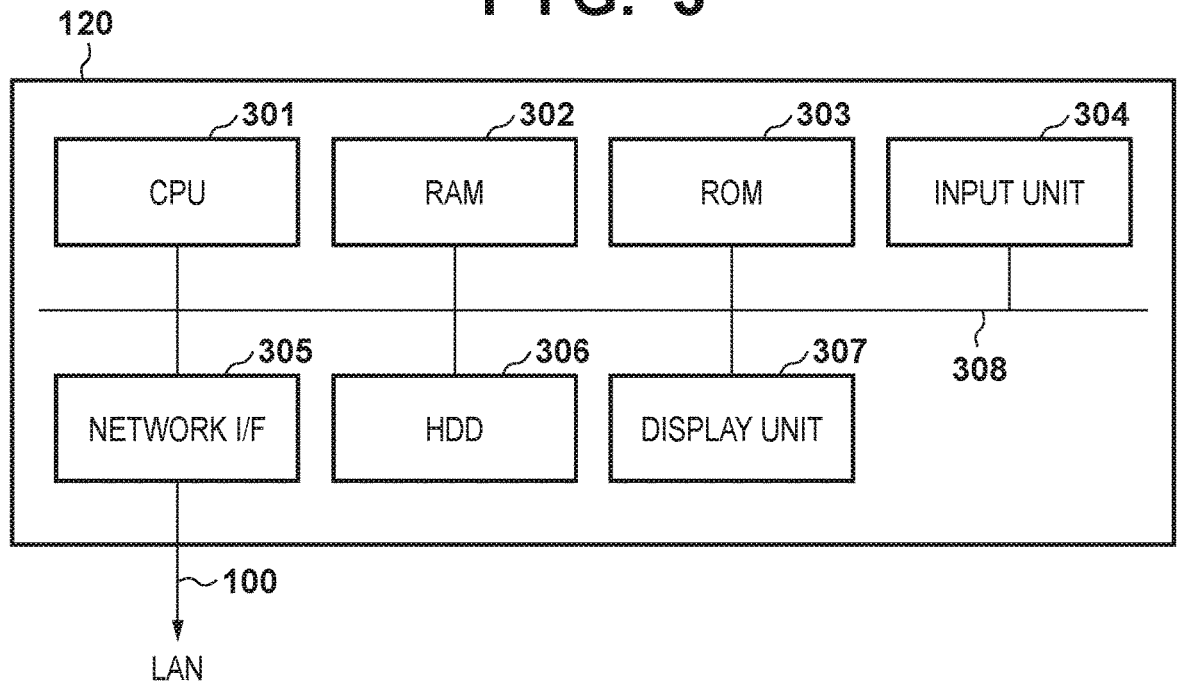
FIG. 3 is a block diagram for showing a hardware configuration of a file server according to the first embodiment.

FIG. 3 is a block diagram for showing a hardware configuration of the file server 120 according to the first embodiment.

The file server 120 comprises a CPU 301, a RAM 302, a ROM 303, an input unit 304, a network I/F 305, a hard disk drive (HDD) 306, and a display unit 307, and these are connected communicably to each other via a system bus 308. The ROM 303 stores a boot program, and upon a powering on, the CPU 301 reads the boot program, and deploys into the RAM 302 an OS, control programs, or the like, which are installed in the HDD 306. Functions of the file server 120 are realized by the CPU 301 then executing programs deployed into the RAM 302. Also, the CPU 301 performs communication with other apparatuses on the LAN 100 that are connected via the network I/F 305. The input unit 304 includes a keyboard, a pointing device, or the like, and accepts instructions from a user. The display unit 307 performs display of menu screens, messages, or the like, to the user. Note that the display unit 307 may have a touch panel function.

Figure 4:
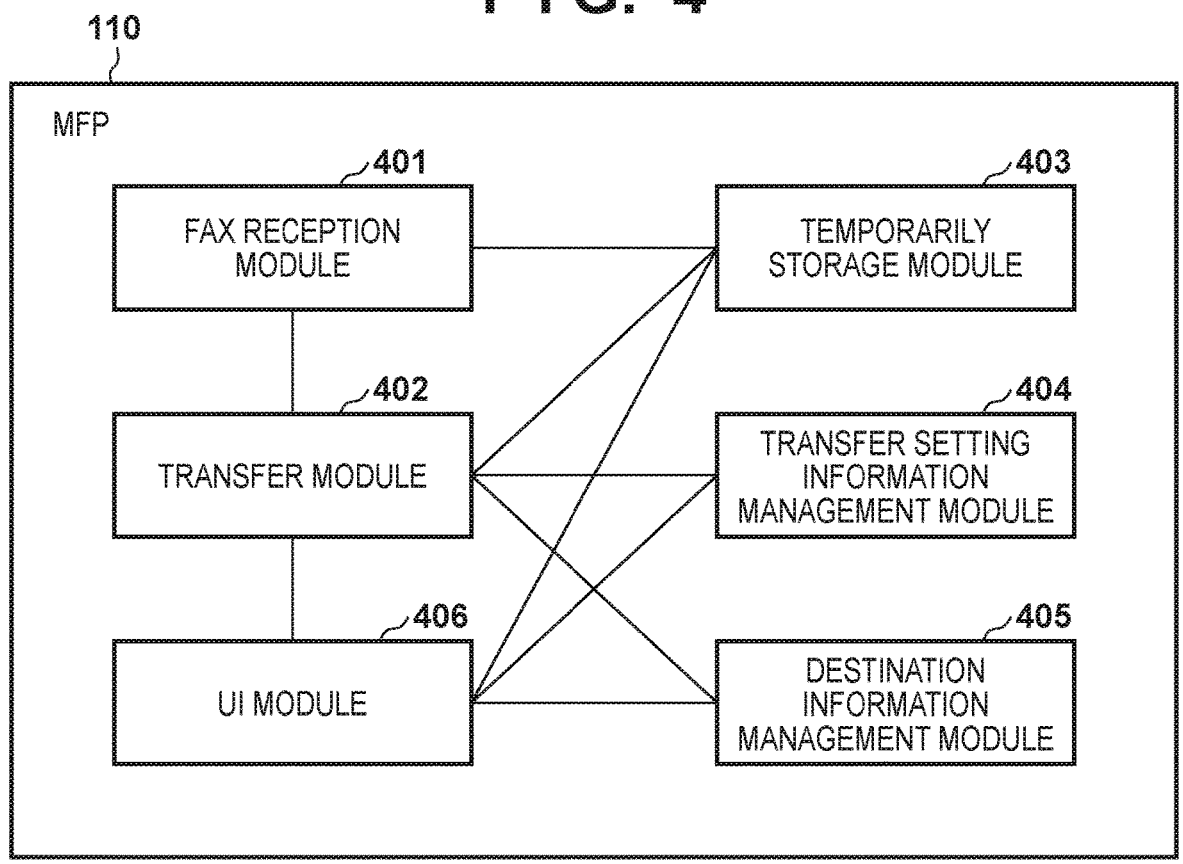
FIG. 4 is a functional block diagram for explaining a software module configuration of the MFP according to the first embodiment.

FIG. 4 is a functional block diagram for explaining a software module configuration of the MFP 110 according to the first embodiment. These software modules are installed on the HDD 204 of the MFP 110, and are executed under the control of the CPU 201 having been deployed into the RAM 203 upon execution.

A fax reception module 401 performs reception processing when the modem 210 receives a facsimile signal. The fax reception module 401 receives facsimile data received via the modem 210, converts the facsimile data into a PDF, or the like, thereby creating a fax document, and saves the fax document as an image file in the HDD 204 by a temporarily storage module 403. Also, the fax reception module 401 generates a control file including a received date time, which is a date/time at which the fax reception was performed, a transmission source number which is a telephone number of an external fax terminal (not shown) that sent the facsimile data via the telephone public circuit network 150. Then, the control file, along with the image file (the fax document) are saved in the HDD 204. Note, it goes without saying that while the expression "fax document" is used in embodiments, generally the fax document may include an image.

A transfer module 402 transfers an image file that the fax reception module 401 saved in the HDD 204 to the file server 120. At this time, the transfer module 402 reads the received date time and the transmission source number from the control file that the fax reception module 401 saved to the HDD 204 associated with the image file. Also, the transfer module 402 obtains from a transfer setting information management module 404 transfer setting information which is later explained with reference to FIG. 7. Also, the transfer module 402 transmits the transmission source number to a destination information management module 405, and obtains a registered name corresponding to the transmission source number from the telephone number of destination information, which is explained later with reference to FIG. 6.

Figures 5, 6, 7:
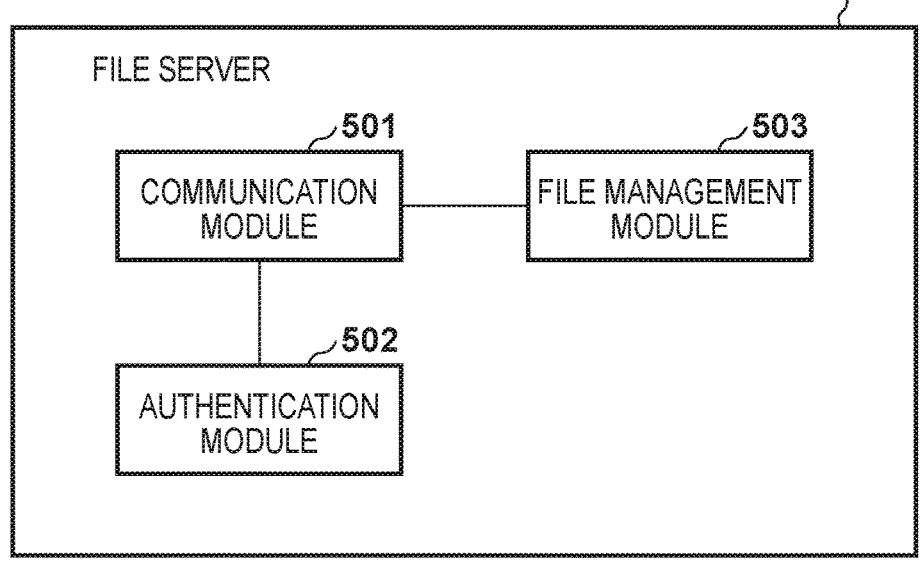
FIG. 5 is a functional block diagram for explaining a software module configuration of the file server according to the first embodiment.
FIG. 6 depicts a view illustrating an example of destination information stored in a destination information management module of the MFP according to the first embodiment.
FIG. 7 depicts a view illustrating an example of a file storing transfer setting information stored in a transfer setting information management module of the MFP according to the first embodiment.

FIG. 6 depicts a view for explaining an example of the destination information stored in the destination information management module 405 of the MFP 110 according to the first embodiment.

The destination information is something that a user registers in advance to the destination information management module 405 via the console unit 111 of the MFP 110. From column 601 to column 603, and column 607 illustrate columns of data records of row 604 to row 606. A destination ID in the column 601 is an identifier for uniquely identifying a destination. A registered name in the column 602 indicates a specific user name corresponding to the destination ID. A telephone number in the column 603 indicates a transmission source number upon fax reception (a telephone number) corresponding to the registered name. A destination table name in the column 607 indicates a group of a destination table (an address book) under which the destination corresponding to the registered name falls under.

FIG. 7 depicts a view illustrating an example of a file storing transfer setting information stored in the transfer setting information management module 404 of the MFP 110 according to the first embodiment.

In the file items set on a file server setting screen of FIG. 9, a file naming rule setting screen of FIG. 10, a folder naming rule setting screen of FIG. 11, which are explained later, are stored. These setting screens will be explained in detail later. Note that a format of these files may be CSV, XML, or another format, and the format is irrelevant.

A hostname 701 indicates a host name of the file server 120. In the view, "sharedserver" is designated as the host name of the file server 120. Note that an IP address of the file server 120 may be used as the host name. A folderpath 702 indicates a path that is the starting point of a storage destination folder of the transferred image file. In the figure "root" is designated as the storage destination folder path. A username 703 indicates a login user's name for authenticating towards the file server 120. In FIG. 7, "administrator" which indicates an administrator is designated as a login user's name. A password 704 indicates a password for authenticating towards the file server 120. In the figure, "32942xc45" is designated as the password. Note that the character string of the password may be obfuscated using an encryption method such as hashing. A filenamerule 705 indicates a file naming rule for when saving an image file on the file server 120. A foldernamerule 706 indicates a folder path naming rule for when saving an image file on the file server 120. These will be explained in detail later.

The transfer module 402 generates a file name of the image file transmitted to the file server 120 based on the filenamerule 705, the registered name, the telephone number, the received date time, the destination table name, a line name, a serial number, a random number, or the like. Also, the transfer module 402 generates a folder name for the image file transmitted to the file server 120 and saved based on the foldernamerule 706, the registered name, the telephone number, the reception day, and the reception month. Then, the transfer module 402 reads an image file saved in the HDD 204, adds the above described file name and folder name to the image file and transmits these to the file server 120 designated by the hostname 701. Also, the transfer module 402 can perform a later explained transmission test using a telephone number and a received date time received from a UI module 406, and a fax document for testing saved in advance in the HDD 204 by similar processing content to the previously explained file transfer processing.

The temporarily storage module 403 receives the control file and the image file and saves and manages these in the HDD 204. The transfer setting information management module 404 saves and manages in the HDD 204 the transfer setting information shown in FIG. 7, for example, which is set by the UI module 406, which is described later. Also, the transfer setting information management module 404 transmits saved transfer setting information to the transfer module 402 in accordance with a request from the transfer module 402. The destination information management module 405 saves and manages in the HDD 204 the destination information shown in FIG. 6, for example, which is set by the UI module 406, which is described later. The UI module 406 displays various screens on the display unit of the console unit 111 via the console unit I/F 205, and detects the content input by the user via the pointing device, the hardware keys, or the like, of the console unit 111. Also, the UI module 406 displays a status display screen which is explained later with reference to FIG. 8 on the console unit 111, and accepts a user input of whether or not to perform the transfer setting. Also, the UI module 406 displays a file server setting screen which is explained later with reference to FIG. 9, obtains file server settings input by the user, transmits them to the transfer setting information management module 404, and requests saving of the file server settings. Furthermore, the UI module 406 displays on the console unit 111 a setting screen for file naming rules which is later explained with reference to FIG. 10, obtains file naming rules input by the user, transmits them to the transfer setting information management module 404, and requests the saving of the file naming rules. Furthermore, the UI module 406 displays on the console unit 111 a setting screen for folder naming rules which is later explained with reference to FIG. 11, obtains folder naming rules input by the user, transmits them to the transfer setting information management module 404, and requests the saving of the folder naming rules. Also, the UI module 406 displays a transmission test screen which is explained later with reference to FIG. 12 on the console unit 111, obtains a telephone number of a transmission source and a received date time input by the user, transmits these to the transfer module 402, and requests a transmission test.

FIG. 5 is a functional block diagram for explaining a software module configuration of the file server 120 according to the first embodiment. These software modules are stored in the HDD 306 of the file server 120, deployed into the RAM 302 upon execution, and executed under the control of the CPU 301.

A communication module 501 comprises a file transmission service such as SMB (Server Message Block), WebDAV (Web-based Distributed Authoring and Versioning), or the like. The communication module 501 accepts requests via the LAN 100, performs processing, and then makes a response with the processing result. An authentication module 502 performs authentication of a client (the MFP 110 here) based on authentication information included in a request to the file transmission service. A file management module 503 performs management of files stored in the HDD 306 in accordance with requests to a file transmission service. The file management module 503 saves image files in the HDD 306 in accordance with folder names and file names received from the MFP 110 via the communication module 501, and reads image files. Also, the file management module 503 confirms whether or not a folder of a folder name received from the MFP 110 via the communication module 501 exists in the HDD 306. Also, the file management module 503 generates folders in the HDD 306 in accordance with folder names received from the MFP 110 via the communication module 501.

Next, with reference to FIG. 7, explanation will be given for the filenamerule 705, which is a file naming rule for when saving an image file to the file server 120.

The format of this naming rule is [item name 1] separator ("_" here) [item name 2] separator ("_" here) [item name 3]. For example, when adding a new item name, a separator "_" and the added item name are added to the existing naming rule. For example, when further adding "item name 4" in FIG. 7, the naming rule becomes [item name 1]_[item name 2]_[item name 3]_[item name 4]. Also, the item name [REGISTEREDNAME] corresponds to the registered name in FIG. 6, the item name [FAXNUMBER] corresponds to the telephone number of FIG. 6, and [DATE] indicates the received date time. Also, while not shown graphically, the item name [ADDRESSTABLENAME] indicates a destination table, and the item name [LINENAME] indicates a line name. Also, the item name [SERIAL] indicates a serial number that the system generates, and more specifically is a number such as [00000001], and a different serial number is set every time. The item name [RANDOM] indicates a random number that the system generates, which is a number such as "a761232ed4211cebacd00aa0057b223" for example, and a random number that is different every time is set. In FIG. 7, [REGISTEREDNAME]_[FAXNUMBER]_[DATE] is designated as the file naming rule, and in such a case the file name becomes [the registered name the telephone number (of the transmission source)_the date".

The foldernamerule 706 indicates a folder path naming rule for when saving an image file on the file server 120. The format of the naming rule is [item name 1] path separator symbol ("/" here) [item name 2] path separator symbol ("/" here) [item name 3]. When newly adding an item name, a path separator symbol ("/") and an added item name are added to the existing naming rule. For example, in a case where item name 4 is added, the naming rule for the folder path becomes [item name 1]/(path separator symbol)[item name 2]/[item name 3]/[item name 4]. Also, the item name [REGISTEREDNAME] indicates a registered name, the item name [FAXNUMBER] indicates a telephone number, and [DATE] indicates a received date time. In FIG. 7, [REGISTEREDNAME]/[FAXNUMBER]/[DATE] is designated as the naming rule for the folder path, and "registered name/telephone number/date" is the folder path of the save destination.

FIG. 8 depicts a view illustrating an example of a status display screen displayed on the console unit 111 of the MFP 110 according to the first embodiment.

Figure 13:
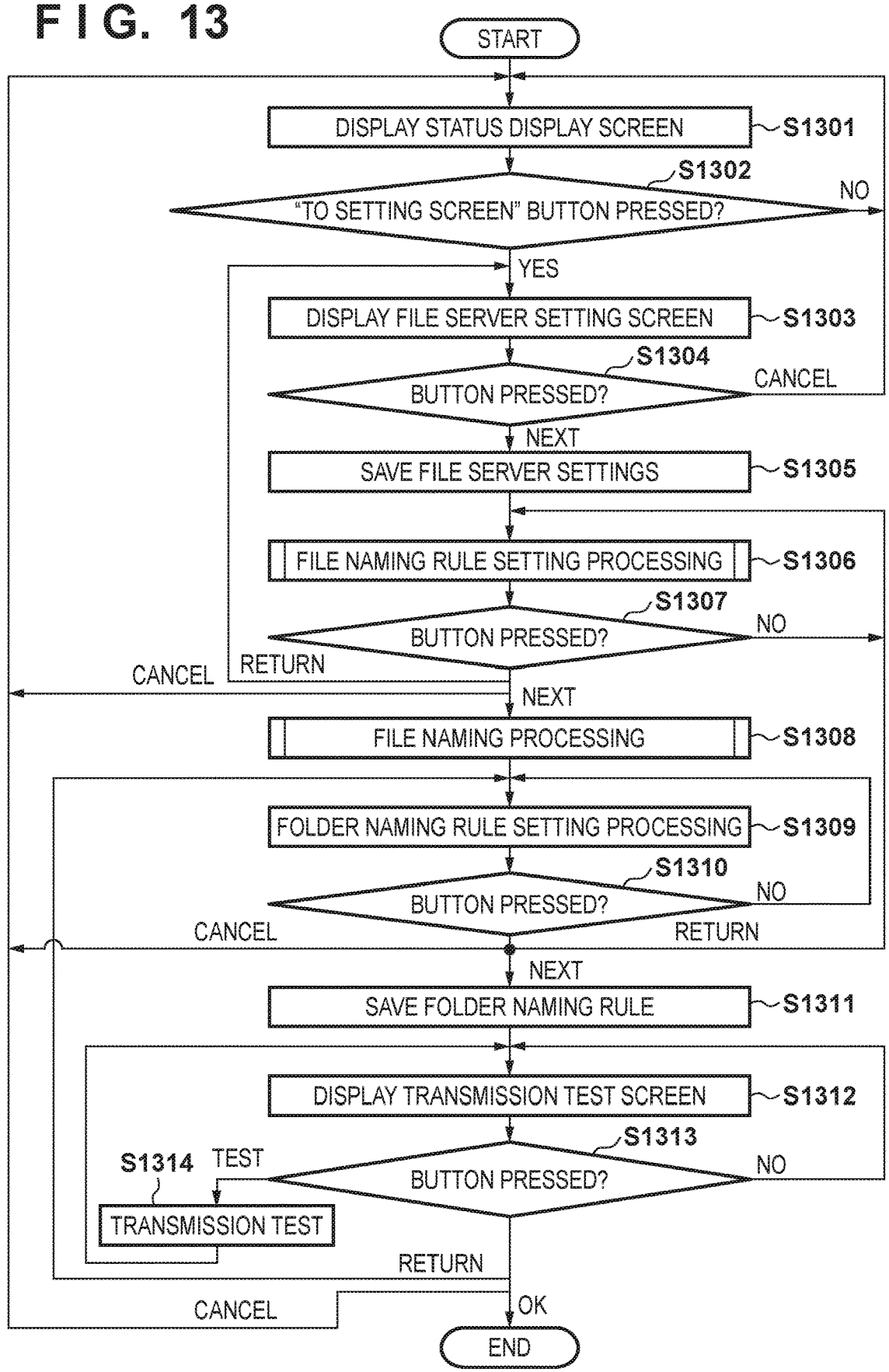
FIG. 13 is a flowchart for describing file server setting, and file naming rule and folder naming rule setting processing by the MFP according to the first embodiment.

In a status display 801, operation statuses of software modules of FIG. 4 which are operating on the MFP 110, and the MFP 110 is displayed. When the UI module 406 performs a display of the status display screen, the UI module 406 confirms the operation statuses of the software module of the MFP 110 and the system modules. Then, the UI module 406 displays that operation is normal when the software modules of the MFP 110 and the system modules are operating normally, and displays a status of a software module or a module for which a abnormality is occurring when an abnormality is occurring. A "to setting screen" button 802 instructs to transition to a screen for modifying the transfer setting information managed by the transfer setting information management module 404 of the MFP 110. When a user presses (instructs) the "to setting screen (TO SETTING SCREEN) button 802, transfer setting modification processing which is explained later with reference to FIG. 13, is activated and the file server setting modification screen shown in FIG. 9 is transitioned to.

Note that a GUI button for updating the status display 801 in accordance with the latest statuses of the software module of the MFP 110 and the operation statuses of the modules of the MFP 110 may be arranged on the status display screen shown in FIG. 8.

Also, in the first embodiment, when the "to setting screen" button 802 is pressed, transition is made to the file server setting screen of FIG. 9, but GUI buttons may be arranged on the status display screen to directly transition to the screens of FIG. 10, FIG. 11, and FIG. 12 which are explained later.

FIG. 9 depicts a view illustrating an example of a file server setting screen that the MFP 110 according to the first embodiment displays.

A host name input box 901 is an input field for inputting a host name of the file server 120 which is a transfer destination of an image file (fax document). A name input into the host name input box 901 is transmitted to the transfer setting information management module 404 by the UI module 406 of the MFP 110, and saved as the hostname 701 (FIG. 7) of the transfer setting information. A folder path input box 902 is an input field for inputting a folder name for the file server 120, which is a transfer destination for an image file. A name input into this input box 902 is transmitted to the transfer setting information management module 404 by the UI module 406 of the MFP 110, and saved as the folderpath 702 (FIG. 7) of the transfer setting information. A login user name input box 903 is an input field for inputting a login user's name that is necessary for authentication on the file server 120, which is the transfer destination of the image file. A name input into this input box 903 is transmitted to the transfer setting information management module 404 by the UI module 406 of the MFP 110, and saved as the username 703 (FIG. 7) of the transfer setting information. A login password input box 904 is an input field for inputting a login password that is necessary for authentication on the file server which is the transfer destination of the image file. In this input box 904, "*" is displayed for input text in order to hide the content that the user inputs. The display of the input text is not limited to "*", and may be another symbol such as "+" for example; alternatively the text may be displayed without hiding it. The password input in the input box 904 is transmitted to the transfer setting information management module 404 by the UI module 406 of the MFP 110, and is saved as the password 704 in the transfer setting information (FIG. 7). A cancel button 905 is a button for cancelling the modifications on transfer setting information with this screen. When a user presses the cancel button 905, a transfer setting modification made via this screen is cancelled, and transition is made to the status display screen of FIG. 8.

A next button 906 is a button for instructing to modify the settings of the file server of the transfer setting information, and to transition to the later described file naming rule setting screen shown in FIG. 10 which is the next screen. When the user presses the next button 906, the file server settings input on the file server setting screen are transmitted to the transfer setting information management module 404 by the UI module 406 of the MFP 110, and the transfer setting management module saves those file server settings. Then the UI module 406 transitions to the file naming rule setting screen which is explained later with reference to FIG. 10.

Figure 10:
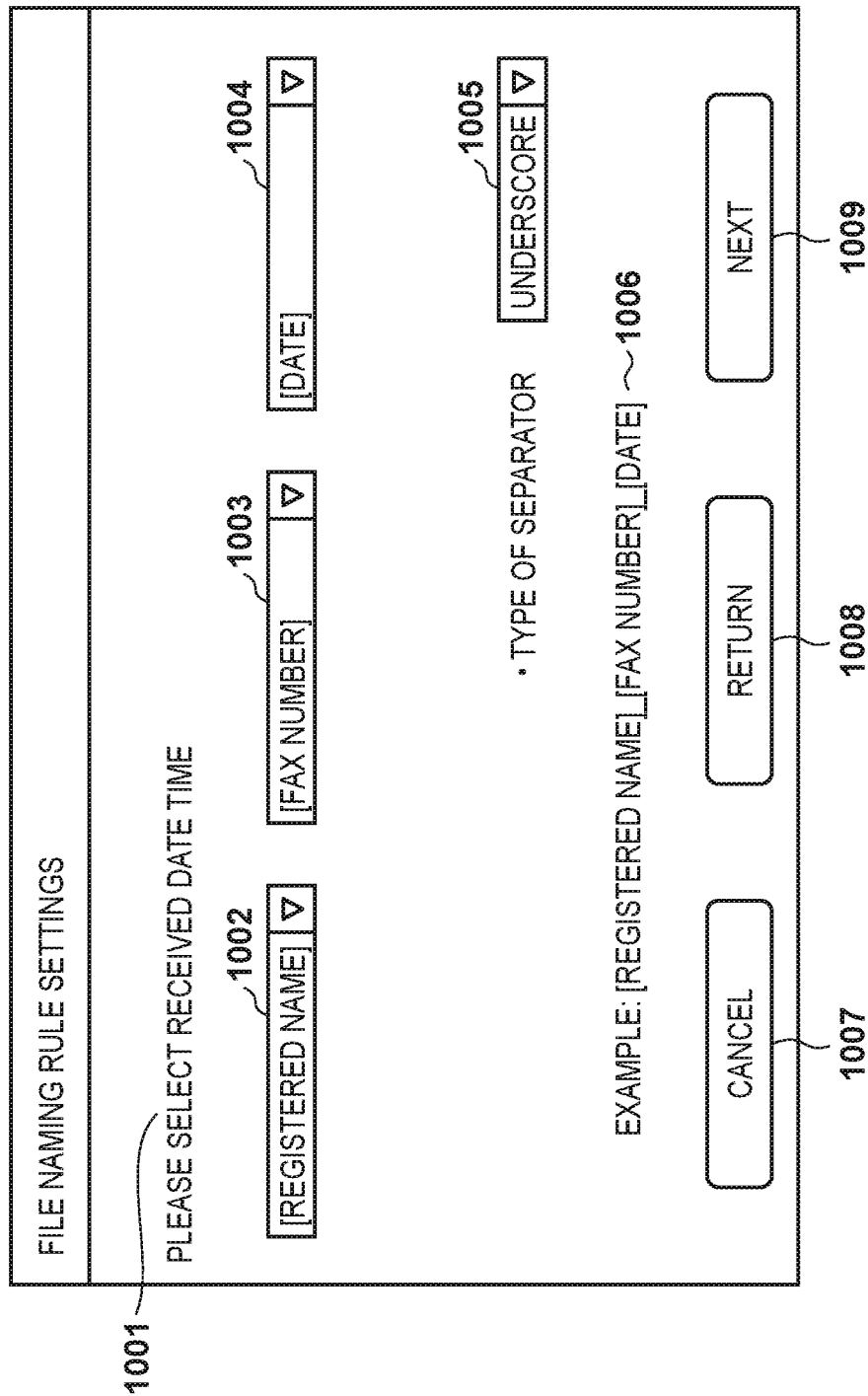
FIG. 10 depicts a view illustrating an example of a setting screen for setting a file naming rule that the MFP according to the first embodiment displays.
Figure 11:
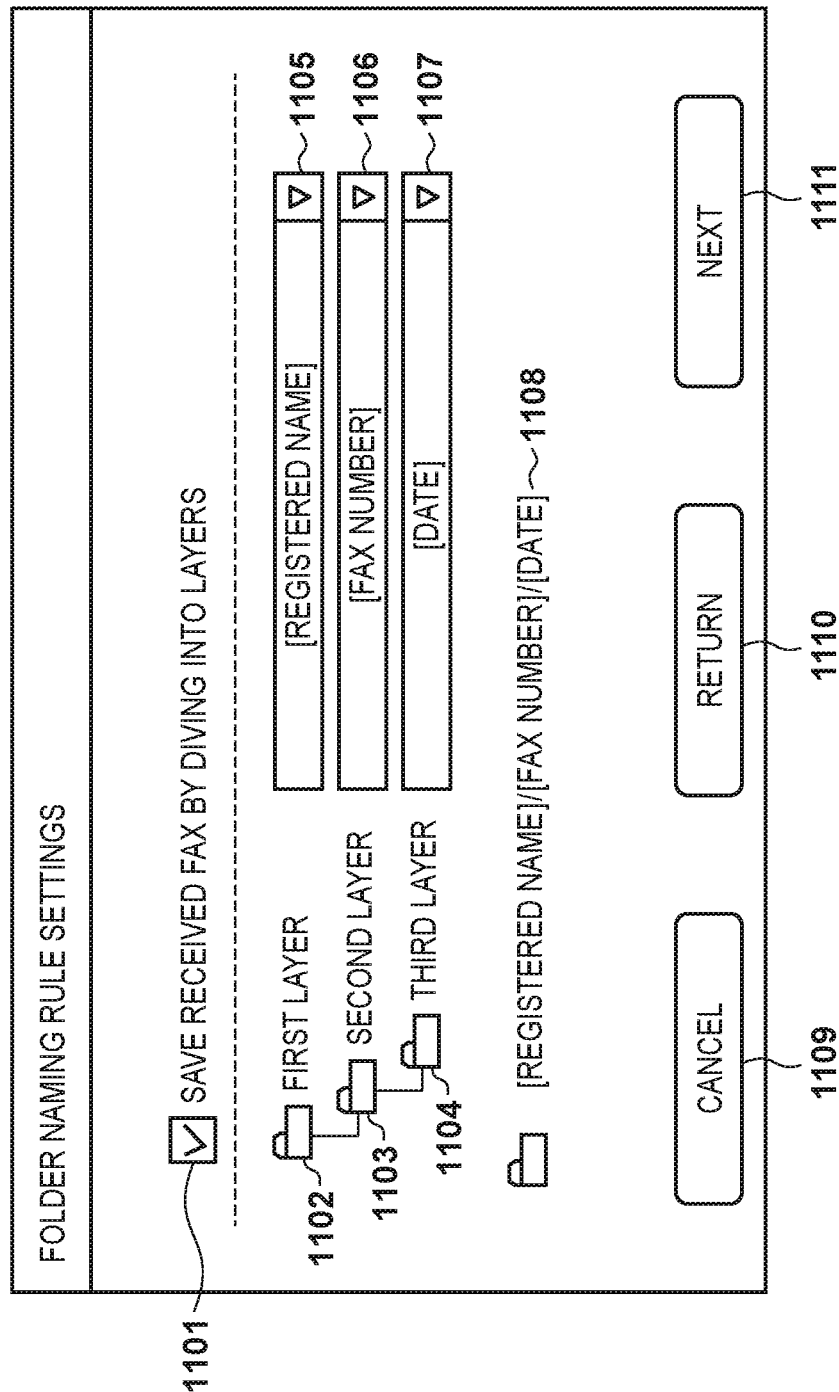
FIG. 11 depicts a view illustrating an example of a setting screen for setting a folder naming rule that the MFP according to the first embodiment displays.
Figure 12:
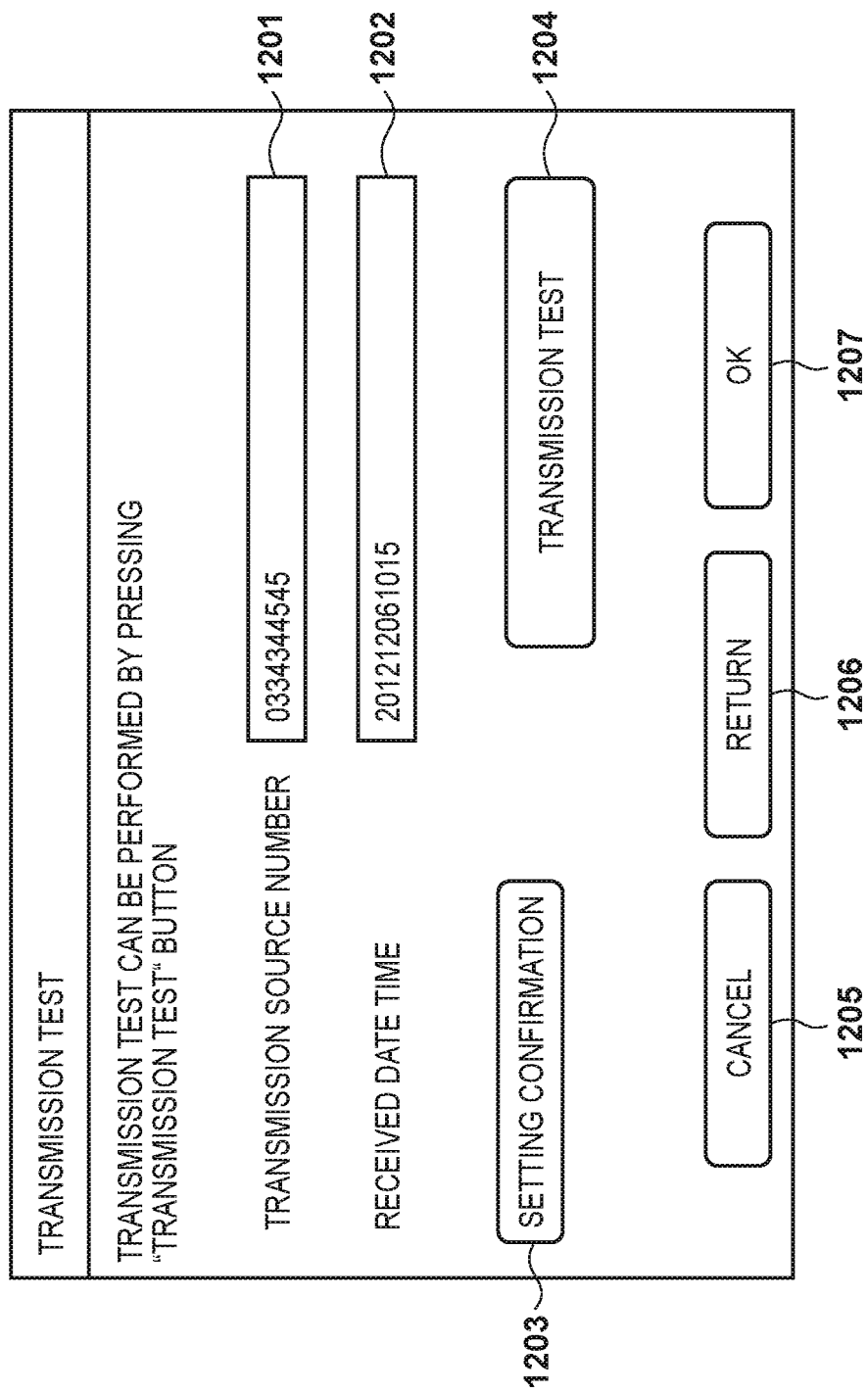
FIG. 12 depicts a view illustrating an example of a transmission test screen that the MFP according to the first embodiment displays.

Note that in the first embodiment, when the next button 906 is pressed, transition is made to the file naming rule setting screen of FIG. 10, but GUI buttons may be arranged on the file server setting screen in order to directly transition to the screens of FIG. 11 or FIG. 12.

FIG. 10 depicts a view illustrating an example of a setting screen for setting a file naming rule that the MFP 110 according to the first embodiment displays. The file name of the image file that is transferred to the file server 120 is determined in accordance with the file naming rule that the user sets via the file naming rule setting screen.

Items 1002-1004 are areas for designating item names from out of registered name, telephone number, received date time, destination table name, line name, serial number, and random number item names that are used in the file name; here the registered name, the telephone number, and the received date time are selected. Here the item 1002 indicates a first item name of the file name, the item 1003 indicates a second item name of the file name, and the item 1004 indicates a third item name of the file name. Here the items of the file name can be selected by pull-down menus. As choices in the pull-downs, there are "none", "registered name", "fax number", "date", "destination table name", "line name", "serial number", and "random number". Note that "line name" is obtained as the registered name corresponding to the telephone number shown in FIG. 6, for example, based on a facsimile number designated as a transmission destination. Also, when "none" is selected, it is indicated that none of the item names choices thereafter are generated. For example, when "registered name" is selected for the first item 1002 and "none" is selected for the second item 1003, it is determined that there is no designation for the second item or items thereafter, and so the file name becomes simply "registered name". An item 1005 is a pull-down menu for selecting a symbol for a separator which indicates item separation; "hyphen", "underscore", "space", or the like, are choices for separators, and it is possible to select any one of these as the separator.

A preview display 1006 displays what the file name will be like in accordance with the selections for the items 1002-1004. The display content of this displays a file name in accordance with the selection items according to the selections of the items 1002-1004. In the example of FIG. 10, "registered name" is selected for the first item 1002, "fax number (telephone number)" is selected for the second item 1003, and "date" is selected for the third item, and underscore "_" is selected as the separator. Accordingly, the preview display for the file name is "[registered name]_[fax number]_[date]". A message 1001 is displayed when a predetermined condition of selection of any of the received date time (date), the serial number, or the random number in the items 1002-1004 is not satisfied. This is because when none of the received date time (date), the serial number, and the random number is selected, a file name that can be identified uniquely cannot be determined. In the example of FIG. 10, date is selected in item 1004, but when date is not selected for any of the items 1002-1004, for example, "please select a received date time" is displayed as the message 1001. Note that in the above described predetermined condition, it is assumed that the received date time, for example, includes time information up until the second unit. Also, if information other than this is necessary in order to identify the file name uniquely, the above described predetermined condition may include information other than that described above.

A cancel button 1007 instructs that the content input via the setting screen be cancelled. When a user presses the cancel button 1007, transition is made to the status display screen shown in FIG. 8, for example. A return button 1008 instructs that the previous screen be returned to. When the user presses the return button 1008, transition is made to a file server setting screen shown in FIG. 9, for example. A next button 1009 instructs that the next screen be proceeded to. When the user presses the next button 1009, transition is made to a folder naming rule setting screen shown in FIG. 11, for example.

Note that the next button 1009 becomes press able when any of the date, the serial number, or the random number is selected in the items 1002-1004. When none of the items is selected, the next button 1009 cannot be selected, and the next button 1009 cannot be pressed. With this, a file name being generated in accordance with a naming rule by which the file name is not unique can be suppressed.

FIG. 11 depicts a view illustrating an example of a setting screen for setting a folder naming rule that the MFP 110 according to the first embodiment displays. The folder name of a file saved to the file server 120 is determined in accordance with the folder naming rule set on this screen.

A check box 1101 is a check-box for allowing a user to select whether or not to save an image file dividing into layers. When the check box 1101 is checked, the folder name is generated by the naming rule set on this screen, and the image file is saved therein. When the check box 1101 is not checked, the image file is saved directly below the folder path designated by the file server setting screen shown in FIG. 9.

Items 1102-1104 show layer names. Here a first layer 1102, a second layer 1103, and a third layer 1104 of the folder are included. Here the folder names corresponding to each level can be selected by pull-down menus 1105-1107. As choices in the pull-downs, "none", "registered name", "fax number", "reception day", "reception month", "destination table name", "line name" are included. Also, when "none" is selected, it is indicated that none of the layers of the choices thereafter are generated. For example, when "registered name" is selected for the first layer 1102 and "none" is selected for the second layer 1103, it is determined that there is no designation for the folder name of the second layer or items thereafter, and so the folder name becomes simply "registered name". A preview display 1108 shows a preview display of the folder name in accordance with the selection results for the items 1102-1104. In the example of FIG. 11, "registered name" is selected for the first layer 1102, "fax number" is selected for the second layer 1103, and "reception day" is selected for the third layer 1104, and so the preview display 1108 is "[registered name]/[fax number]/[reception day]".

A cancel button 1109 instructs that the user operation input via the setting screen be cancelled. When a user presses the cancel button 1109, transition is made to the status display screen shown in FIG. 8, for example. A return button 1110 instructs that the previous screen be returned to. When the user presses the return button 1110, transition is made to a file naming rule setting screen shown in FIG. 10, for example. A next button 1111 instructs that the next screen be proceeded to. When the user presses the next button 1111, transition is made to the transmission test screen shown in FIG. 12, for example.

FIG. 12 depicts a view illustrating an example of a transmission test screen that the MFP 110 according to the first embodiment displays.

A transmission source number input box 1201 is an input field for inputting information used as a transmission source telephone number when performing a transmission test. A telephone number input into the transmission source number input box 1201 is transmitted to the transfer module 402 by the UI module 406 of the MFP 110 and is used as a transmission source number (telephone number) upon a transmission test. A received date time input box 1202 is an input field for inputting a date/time used as the received date time for when performing a transmission test. A date/time input into the received date time input box 1202 is transmitted to the transfer module 402 by the UI module 406 of the MFP 110, and used as the received date time upon a transmission test.

A setting confirmation button 1203 is a button for transitioning to a setting confirmation screen (not shown) for displaying transfer setting information input via the setting screens of FIG. 9, FIG. 10, and FIG. 11. When the user presses the setting confirmation button 1203, a setting confirmation screen for displaying transfer setting information input via screens as shown in FIG. 9, FIG. 10, and FIG. 11 is displayed by the UI module 406 of the MFP 110. A transmission test button 1204 is a button for instructing so that a transmission test is performed using the transfer setting information input via screens as shown in FIG. 9, FIG. 10, and FIG. 11, and information input by the transmission source number input box 1201 and the received date time input box 1202. When the user presses the transmission test button 1204, the UI module 406 of the MFP 110 transmits the telephone number of the transmission source number input box 1201 and the date/time of the received date time input box 1202 to the transfer module 402, and a transmission test request is transmitted to the transfer module 402. The transfer module 402 performs a test transmission to the file server 120 which assumes that a fax document is received at a date/time and a transmission source number received when the transmission test button 1204 is pressed. The transfer module 402 displays a transmission test result screen (not shown) for displaying the result of the test transmission when the test transmission completes.

A cancel button 1205 is a button for cancelling the transfer setting information settings. When a user presses the cancel button 1205, transition is made to the status display screen shown in FIG. 8, for example. A return button 1206 is a button for transitioning to the previous screen. When the user presses the return button 1206, transition is made to the folder naming rule setting screen of FIG. 11, which is the previous screen. An OK button 1207 is a button for completing the setting of the transfer setting information, and transitioning to the status display screen shown in FIG. 8. When the user presses the OK button 1207, the UI module 406 of the MFP 110 transitions to the status display screen shown in FIG. 8.

Note that in the first embodiment, a transmission source number used upon testing is input by the transmission source number input box 1201, and the received date time is input by the received date time input box 1202. However, an input box, an input button, or the like, may be arranged in order to designate a fax document used for another transmission test.

FIG. 13 is a flowchart for describing file server setting, and file naming rule and folder naming rule setting processing by the MFP 110 according to the first embodiment. Note that the operations (steps) shown in this flowchart are realized by the CPU 201 of the MFP 110 deploying a control program stored in the HDD 204 into the RAM 203, and executing the control program. Also, this flowchart is executed when a user selects a control program that executes this flowchart via the console unit 111 of the MFP 110.

Firstly, in step S1301, the CPU 201 displays a status display screen such as the one shown in FIG. 8, for example. Next, the processing proceeds to step S1302, and the CPU 201 determines whether or not the "to setting screen" button 802 is pressed on the status display screen. If the "to setting screen" button 802 is pressed, the processing proceeds to step S1303, and the CPU 201 displays the file server setting screen shown in FIG. 9, for example. Then the user inputs a name, a path of a folder, or the like, of a file server which is a transfer destination, authentication information, or the like, via the file server setting screen.

Next, the processing proceeds to step S1304, the CPU 201 determines whether the user pressed the cancel button 905 or the next button 906 on the file server setting screen. When it is determined that the next button 906 is pressed, the processing proceeds to step S1305, and when it is determined that the cancel button 905 is pressed, the information set on this screen is cancelled, and the processing returns to step S1301. In step S1305, the CPU 201 stores setting information of the file server input via the file server setting screen into the HDD 204 of the MFP 110.

Next, the processing proceeds to step S1306, and the CPU 201 displays a file naming rule setting screen, such as the one shown in FIG. 10, for example. Then, the user inputs the file naming rule setting information via this setting screen, and file naming rule setting processing is executed. Next, the processing proceeds to step S1307, and the CPU 201 determines which button the user pressed on the file naming rule setting screen. When a button is not pressed, steps S1306 and S1307 are executed. In step S1307, when it is determined that the next button 1009 is pressed, the processing proceeds to step S1308, but as previously explained, there are cases in which the next button 1009 cannot be pressed. The file naming rule setting processing will be explained later with reference to FIG. 18. Meanwhile, if it is determined that the cancel button 1007 is pressed, the information set on this screen is cancelled, and the processing proceeds to step S1301, and if it is determined that the return button 1008 is pressed, the processing proceeds to step S1303, and, for example, the file server setting screen shown in FIG. 9 is displayed.

Figure 18:
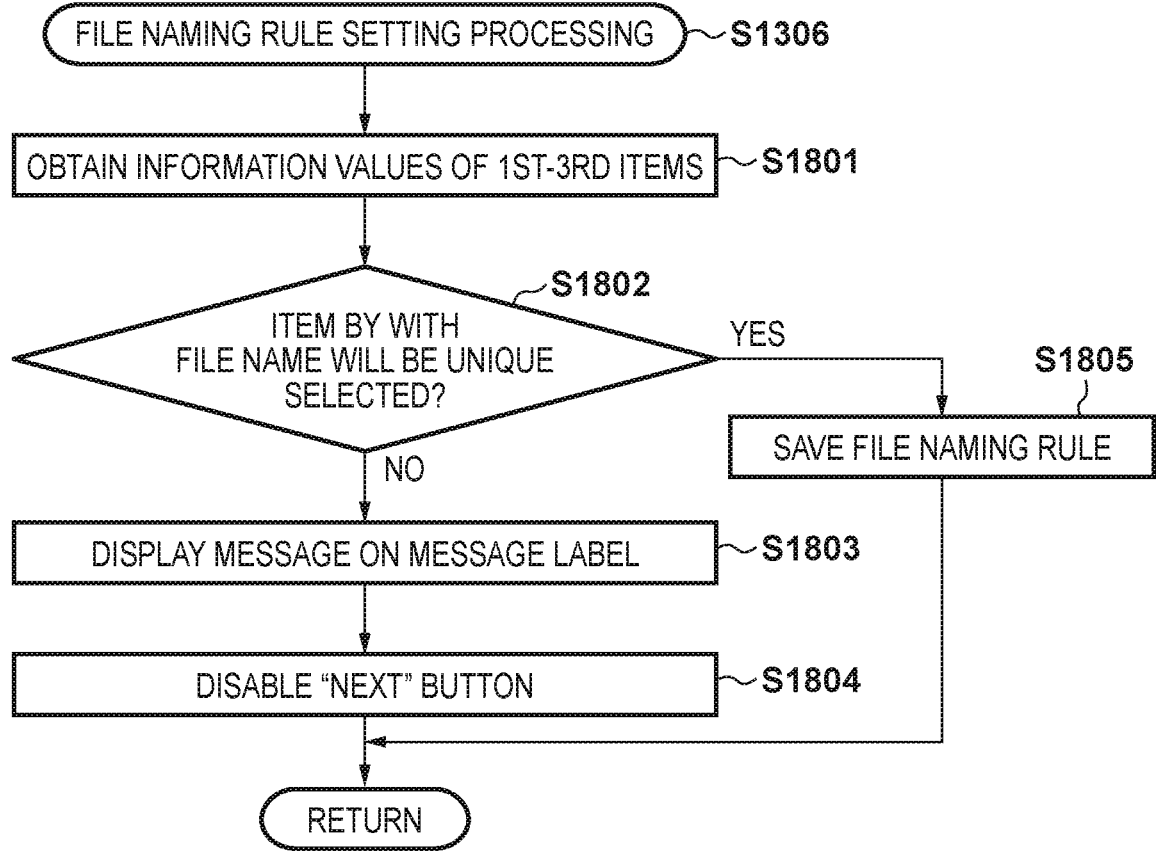
FIG. 18 is a flowchart for describing file naming rule setting processing of step S1306 in FIG. 13.

FIG. 18 is a flowchart for describing file naming rule setting processing of step S1306 in FIG. 13.

Firstly, in step S1801, the CPU 201 obtains information selected by the items 1002-1004 of the setting screen of the file naming rule shown in FIG. 10, for example. Next, the processing proceeds to step S1802, and the CPU 201 determines whether or not at least one of items by which a file name can be set uniquely is selected based on the information obtained in step S1801. Note that the items for which the file name will become unique are, as previously explained, "date", "serial number", and "random number", and it is determined whether or not one or more of these items is included. Then, if one or more of the items for which the name will be unique is included, it is determined that an item by which the file name can be set uniquely is selected, the processing proceeds to step S1805. In step S1805, the CPU 201 stores the file naming rule determined on this screen in the HDD 204.

Meanwhile, if, in step S1802, the CPU 201 determines that an item by which the file name will be unique is not included, the processing proceeds to step S1803. In step S1803, the CPU 201 displays a warning message prompting the user to select an item by which the file name will be unique in the message 1001 of FIG. 10. In FIG. 10, "Please select a received date time" is displayed as the message 1001, but a message may be displayed to cause another item by which the file name will be unique to be selected.

Next, the processing proceeds to step S1804, and the CPU 201 sets so that the user cannot press the next button 1009. More specifically, the CPU 201 sets a state in which the next button 1009 is displayed to be grayed out and disabled (the button cannot be pressed), so that the next screen cannot be transitioned to. By doing this, it is possible to prevent a non-unique file name being added for an image file. In this way, when the file name is designated in a way in which it will be unique on the file naming rule setting screen, the next button 1009 can be pressed, and when the user presses the next button 1009, the processing proceeds to step S1308 (FIG. 13).

Next, in step S1308, the CPU 201 displays a folder naming rule setting screen, such as the one shown in FIG. 11, for example. Then, the user inputs the folder naming rule setting information via this setting screen, and folder naming rule setting processing is executed. Next, the processing proceeds to step S1310, and the CPU 201 determines which button the user pressed on the folder naming rule setting screen. When a button is not pressed, steps S1309 and S1310 are executed. If it is determined that the user presses the next button 1111 in step S1310, the processing proceeds to step S1311. If the user presses the cancel button 1109, the information set on the screen is cancelled and the processing proceeds to step S1301, and if the user presses the return button 1110, the processing proceeds to step S1306, and for example, the file naming rule setting screen shown in FIG. 10 is displayed. In step S1311, the CPU 201 stores in the HDD 204 the information that the user input on the folder naming rule setting screen, for example.

Next, the processing proceeds to step S1312, and the CPU 201 displays the transmission test screen shown in FIG. 12, for example. Next, the processing proceeds to step S1313, and the CPU 201 determines which button the user pressed on the transmission test screen. Here, if the user did not press any button, steps S1312 and S1313 are executed. If it is determined that the user pressed the OK button 1207, the processing completes. Meanwhile, if it is determined that the user pressed the cancel button 1205, the information set on this screen is cancelled, and the processing proceeds to step S1301. Also, if it is determined that the return button 1206 is pressed, the processing proceeds to step S1309, and the folder naming rule setting screen shown in FIG. 11, for example, is displayed. Furthermore, if it is determined that the user pressed the transmission test button 1204, the processing proceeds to step S1314. In step S1314, the CPU 201 executes a transmission test based on the content set in the file server setting screen (FIG. 9), the file naming rule setting screen (FIG. 10), the folder naming rule setting screen (FIG. 11), and the transmission test screen (FIG. 12), and the processing proceeds to step S1312.

Next, explanation will be given for fax reception processing by the MFP 110 according to the first embodiment. Below, explanation is given focusing on processing in which the MFP 110 receives a fax document, and transfers the fax document as an image file. Here, using previously explained transfer setting information (FIG. 7), and destination information (FIG. 6), the received fax document is transferred as an image file to the file server 120. At this time, the file name and the folder name of the fax document (image file) are generated and transferred to the file server 120. Note that the destination information is already registered to the destination information management module 405 by the user in advance via the console unit 111 of the MFP 110 as shown in FIG. 6. Here, an explanation of processing for registering the destination information is omitted.

Figure 14:
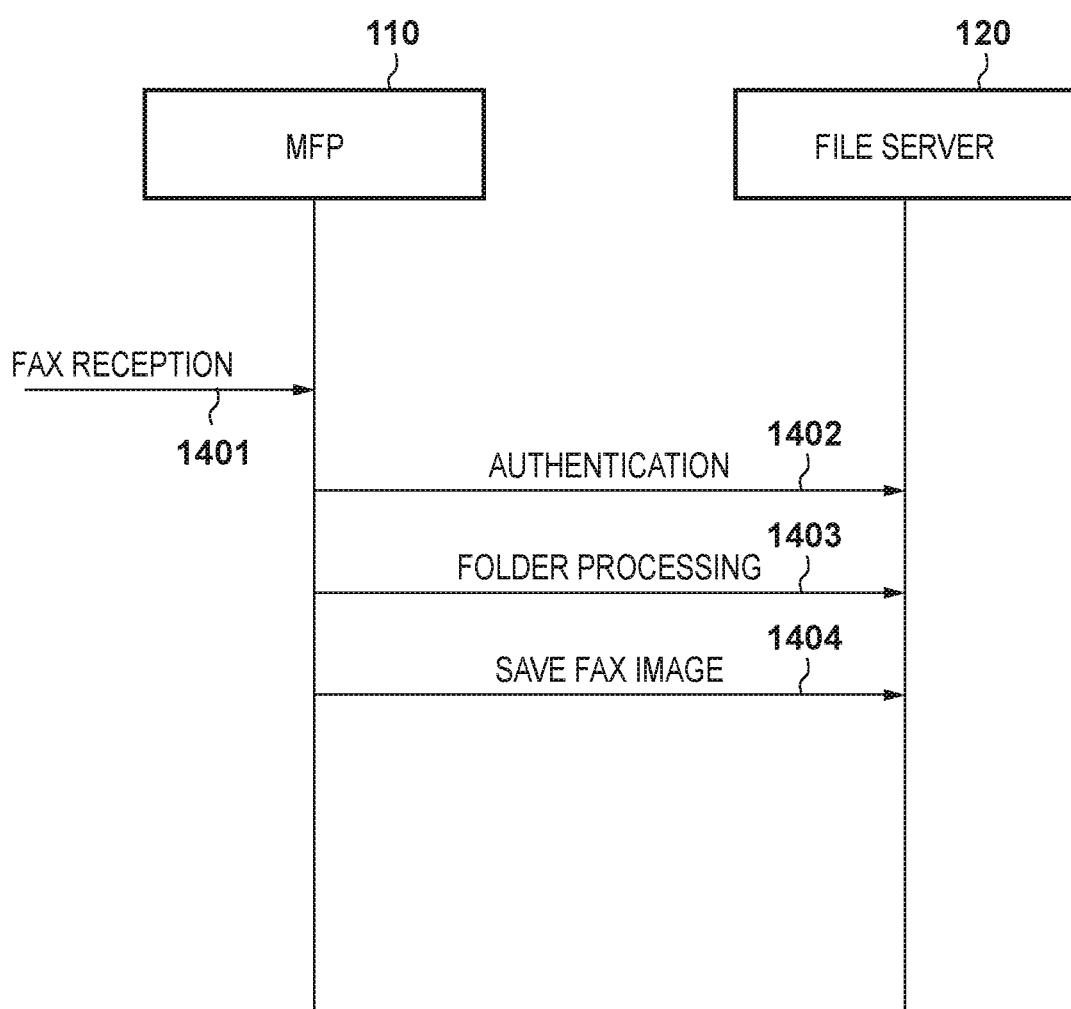
FIG. 14 is a sequence diagram for describing processing in which the MFP according to the first embodiment receives image data in a fax, and transfers an image file of the received image data to the file server.

FIG. 14 is a sequence diagram for explaining processing in which the MFP 110 according to the first embodiment receives image data (document data) in a fax, and transfers an image file of the image data that is received to the file server 120.

A fax image is sent from an external fax terminal to the MFP 110 at 1401. When the MFP 110 receives the fax image, the fax reception module 401 and the transfer module 402 perform fax reception processing.

FIG. 15 is a flowchart for describing fax reception processing by the MFP 110 according to the first embodiment. Note that the operations (steps) shown in this flowchart are realized by the CPU 201 of the MFP 110 deploying a control program stored in the HDD 204 into the RAM 203, and executing the control program.

Firstly, in step S1501 the CPU 201 uses the modem 210 to receive a facsimile signal from an external fax terminal via the public switched telephone network 150. Also, the CPU 201 obtains a telephone number of the external fax terminal as a transmission source number using the modem 210, and further obtains a date/time at which the fax reception is performed as the received date time. Next, the processing proceeds to step S1502, and the CPU 201 converts the fax document received in step S1501 into an image file such as a PDF. Also, the CPU 201 generates a control file in which the telephone number of the transmission source and the received date time obtained in step S1501 are recited. Then, the CPU 201 temporarily stores an image file including the fax document in the HDD 204 along with the control file.

Next, the processing proceeds to step S1503, and the CPU 201 determines whether or not the temporary storing of the image file to the HDD 204 succeeded. If it was able to store the image file, the processing proceeds to step S1504, and the CPU 201 obtains the transmission source telephone number, the received date time, or the like, stored temporarily on the HDD 204. Meanwhile, when the temporary storing of the image file failed, error processing is performed, and the processing completes. An example of when the temporary storing fails is a case that there is insufficient capacity in the HDD 204. Also, in the error processing here, together with causing the printer unit 113 to print the fax document by transmitting it to the printer unit 113 via the printer I/F 209, an error status is caused to be displayed by displaying the status display screen (FIG. 8) on the console unit 111.

Next, the processing proceeds to step S1505, and the CPU 201 generates a file name in order to transfer the image file to the file server 120 referencing the transmission source number and the received date time obtained in step S1504, the transfer setting information (FIG. 7), and the destination information (FIG. 6). Explanation is given with reference to the flowchart of FIG. 16 for details of processing of step S1505.

Figure 16:
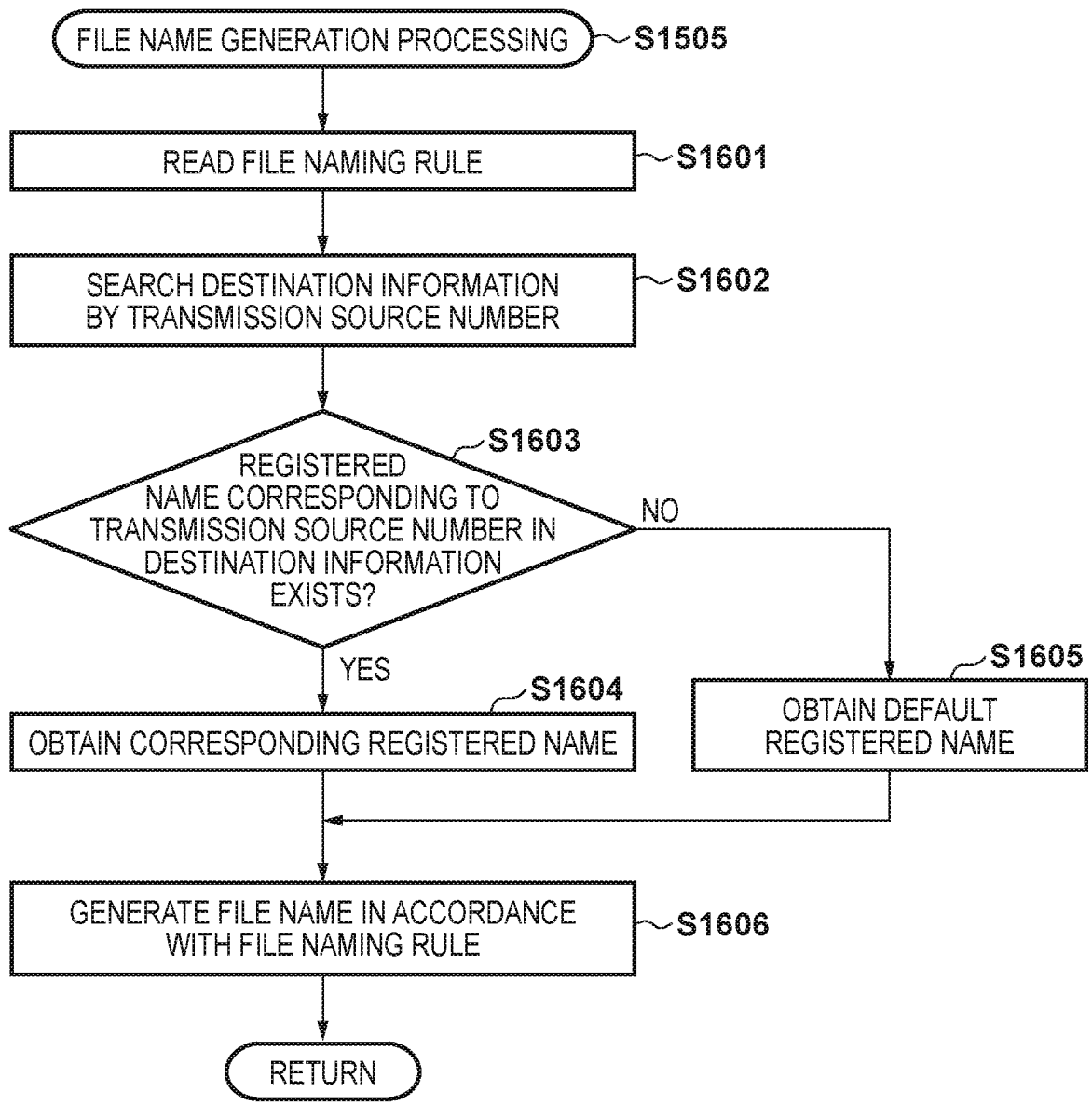
FIG. 16 is a flowchart for describing file name generation processing in step S1505 of FIG. 15 for an image file transferred.

FIG. 16 is a flowchart for describing file name generation processing in step S1505 of FIG. 15 for an image file to be transferred. Note that the operations shown in this flowchart are realized by the CPU 201 of the MFP 110 deploying a control program stored in the HDD 204 into the RAM 203 and executing the control program, and the performer of these operations is explained as the CPU 201.

Firstly, in step S1601, the CPU 201 obtains the filenamerule 705 (file naming rule) saved in the HDD 204. Next, the processing proceeds to step S1602, and the CPU 201 obtains destination information (FIG. 6) based on the telephone number. Here, the destination information is obtained by searching the registered name with the telephone number as a key. Next, the processing proceeds to step S1603, and the CPU 201 determines whether or not the registered name corresponding to the telephone number exists. If the registered name exists, the processing proceeds to step S1604, the CPU 201 obtains the corresponding registered name, and the processing proceeds to step S1606. On the other hand, if the registered name does not exist, the processing proceeds to step S1605, and the CPU 201 obtains a default registered name set in advance, and the processing proceeds to step S1606. Note, an example of the default registered name is when "not available", or the like, is set. Also, the default registered name may be saved in advance in the ROM 202 or the HDD 204. Also, configuration may be taken such that an input box for setting the default registered name is arranged on the file naming rule setting screen of FIG. 10, for example, and the user is able to modify the default name. In step S1606, the CPU 201 generates a file name using the registered name, the telephone number of the transmission source, the received date time, the destination table name, the line name, and the like, in accordance with the file naming rule obtained in step S1601.

Then, the processing proceeds to step S1506 of FIG. 15. In step S1506, the CPU 201 generates the folder name for transferring based on the telephone number of the transmission source and the received date time obtained in step S1504, the transfer setting information (FIG. 7) and the destination information (FIG. 6). Explanation is given with reference to the flowchart of FIG. 17 for details of processing of step S1506.

Figure 17:
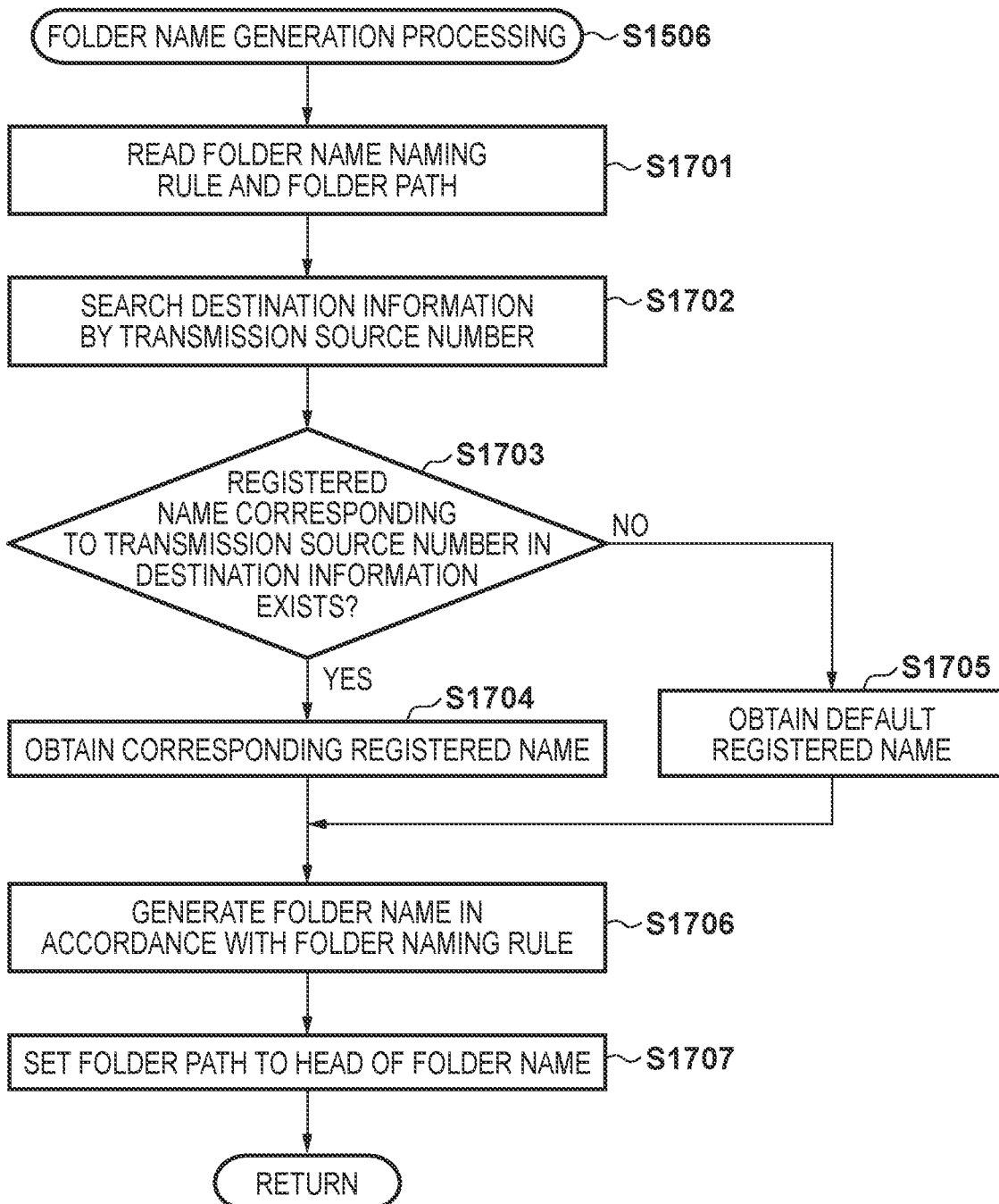
FIG. 17 is a flowchart for describing folder name generation processing in step S1506 of FIG. 15 of the file server on which the image file transferred is stored.

FIG. 17 is a flowchart for describing folder name generation processing in step S1506 of FIG. 15 of the file server 120 on which the image file transferred is stored. Note that the operations shown in this flowchart are realized by the CPU 201 of the MFP 110 deploying a control program stored in the HDD 204 into the RAM 203 and executing the control program, and the performer of these operations is explained as the CPU 201.

Firstly, in step S1701, the CPU 201 obtains the foldernamerule 706 saved in the HDD 204. Next, the processing proceeds to step S1702, and the CPU 201 obtains destination information, and obtains the corresponding registered name by searching for it using the telephone number obtained in step S1504 as the key. Then, the processing proceeds to step S1703, and the CPU 201 determines whether or not a registered name corresponding to the telephone number exists. If it is determined that it does exist, the processing proceeds to step S1704, and the CPU 201 obtains the corresponding registered name, and the processing proceeds to step S1706. Meanwhile, in step S1703, if it is determined that the registered name corresponding to the telephone number does not exist, the processing proceeds to step S1705, and the CPU 201 obtains the default registered name set in advance, and the processing proceeds to step S1706. Note, an example of the default registered name is when "not available", or the like, is set. Also, the default registered name may be saved in advance in the ROM 202 or the HDD 204. Also, configuration may be taken such that an input box for setting the default registered name is arranged on the folder naming rule setting screen of FIG. 11, for example, and so that a user is able to modify the default name saved in the HDD 204 by user input.

In step S1706, the CPU 201 generates a folder name using the registered name, the telephone number of the transmission source, and the received date time in accordance with the foldernamerule 706 obtained in step S1701. Then, the processing proceeds to step S1707, and the CPU 201 sets the folder path to the head of the folder name, and the processing completes.

Next, once again the explanation returns to FIG. 14, and the MFP 110 performs authentication processing on the file server 120 at 1402. This authentication processing is executed from step S1507 of FIG. 15.

In step S1507 of FIG. 15, the CPU 201 reads the transfer setting information (FIG. 7) from the HDD 204, and obtains the hostname 701, the username 703, and the password 704. Then, the CPU 201 accesses the address designated by the hostname 701, and transmits the username 703 and the password 704 to the file server 120 along with the authentication request as the user name and the password respectively. Then, the processing proceeds to step S1508 of FIG. 15.

Once again, the explanation returns to FIG. 14. When the communication module 501 of the file server 120 receives an authentication request from the MFP 110 at 1402, the communication module 501 obtains the user name and the password from the authentication request and transmits them to the authentication module 502. The authentication module 502 performs a verification of the user ID and the password using authentication information saved in the HDD 306, and transmits the result of the authentication to the communication module 501. With this, the communication module 501 transmits the received authentication result to the MFP 110.

In step S1508 of FIG. 15, the CPU 201 determines whether or not the authentication result is received from the file server 120. When it is determined that the authentication result is not received, step S1508 is executed, and when the authentication result is received, the processing proceeds to step S1509, and the CPU 201 determines whether or not the authentication result received in step S1508 is an authentication success. If the CPU 201 determines that it is an authentication success, the processing proceeds to step S1510, and if that is not the case, error processing is performed, and the processing completes. In this error processing, a status display screen (FIG. 8) is displayed on the console unit 111, causing an error status to be displayed.

If the MFP 110 succeeds at authentication at 1402 in FIG. 14, then at 1403, the MFP 110 makes a query as to whether or not a folder of the folder name generated in step S1506 exists on the file server 120 and if no such folder exists in the file server 120, the MFP 110 requests for the file server 120 to generate the folder. Here, the MFP 110 executes the processing of step S1510 of FIG. 15.

In step S1510, the CPU 201 transmits the folder name generated in step S1506 to the file server 120, and transmits an existence confirmation request for a file of the folder name.

Then, when, at 1403 of FIG. 14, the communication module 501 of the file server 120 receives an existence confirmation request for the folder from the MFP 110, the communication module 501 transmits the folder name included in the folder existence confirmation request to the file management module 503, requesting folder existence confirmation processing. With this, the file management module 503 determines whether or not the folder of the received folder name exists in the HDD 306, and transmits the confirmation result to the communication module 501 as the folder existence confirmation result. With this, the communication module 501 transmits the folder existence confirmation result to the MFP 110. Then, the processing proceeds to step S1511 of FIG. 15.

In step S1511, the CPU 201 determines whether or not the folder existence confirmation result was received from the file server 120. If it is determined that the folder existence confirmation is not received, once again the processing proceeds to step S1511. If, in step S1511, it is determined that the folder existence confirmation is received, the processing proceeds to step S1512. In step S1512, the CPU 201 determines whether or not the folder of the folder name generated in step S1506 exists on the file server 120 from the folder existence confirmation received in step S1511. Here, if it is determined that a folder of the same name exists, the processing proceeds to step S1515, and if it is determined that a folder of the same name does not exist, the processing proceeds to step S1513.

In step S1513, the CPU 201 transmits the folder name generated in step S1506 to the file server 120, thereby performing a folder generation request.

Once again, the explanation returns to FIG. 14, and when, at 1403, the communication module 501 of the file server 120 receives the folder generation request from the MFP 110, the communication module 501 transmits the folder name included in the folder generation request to the file management module 503, requesting the generation of the folder of the folder name. The file management module 503 generates the folder of the received folder name in the HDD 306, and transmits a response that it was generated to the communication module 501. When the communication module 501 receives the folder generated response, the communication module 501 transmits a folder generated response to the MFP 110.

In step S1514, the CPU 201 determines whether or not the folder generated response is received from the file server 120. If the folder generated response is not received, step S1514 is executed, and if the folder generated response is received, the processing proceeds to step S1515. In step S1515, the CPU 201 reads the fax document stored on the HDD 204, and transmits the fax document along with the file name generated in step S1505 and the folder name generated in step S1506 to the file server 120, thereby transmitting a file save request.

This corresponds to reference numeral 1404 of FIG. 14. At 1404, the MFP 110 transmits a fax document (image file), designating the file name generated in step S1505, and the folder name generated in step S1506 to the file server 120. When, in this way, the communication module 501 of the file server 120 receives the file save request, the communication module 501 obtains the file, the folder name, and the file name from the file save request. Then, the communication module 501 transmits the obtained file, folder name, and file name to the file management module 503, and requests storage of the designated folder name and file name. The file management module 503 stores the received file in a designated location at the folder name and the file name in the HDD 306, and transmits a storage response to the communication module 501. The communication module 501 transmits the storage response to the MFP 110 as a file transmission response.

In this way, the CPU 201 determines whether or not the file transmission response is received from the file server 120 in step S1516 of FIG. 15. If the file transmission response is not received, the processing once again proceeds to step S1516, and if the file transmission response is received, the processing completes.

By virtue of the above explained processing, when the MFP 110 receives a fax, the MFP 110 generates a file name for the received image file (fax document) in accordance with a file naming rule of the transfer setting information, a transmission source number, a received date time, and a registered name of destination information corresponding to the transmission source number. Also, the MFP 110 generates a folder name in accordance with a folder path and a folder naming rule of the transfer setting information, a transmission source number, a received date time, and a registered name, and the like, of destination information corresponding to a transmission source number. Also, the MFP 110 performs an existence confirmation for the folder that is to be generated towards the file server 120, and if the same folder does not exist on the file server 120, the image file is stored at the location of the generated folder name with the file name having performed a folder generation request.

By the first embodiment, as explained above, by setting a file naming rule and a folder naming rule in advance, it is possible to store an image file received in a fax in a desired folder on a file server by adding a desired file name to the image file. Also for the file naming rule and the folder naming rule, it is possible to search for destination information using a telephone number of the transmission source of a received fax, and to obtain and use a registered name corresponding to the destination information. Also, in the file naming rule, it is possible to set a separator as a separation of the items. Furthermore, in the file naming rule, it is possible for the user to select items such that the file name will become unique in a format that the user can recognize. With this, it is possible to increase file name setting flexibility and to improve work efficiency for the user.

Also, because it is possible to generate a desired folder on the file server on which the image file is saved, there is the effect that the effort of the user searching for the desired image file can be reduced.

Second Embodiment

Next, explanation will be given for a second embodiment of the present invention. In the second embodiment, explanation is given for an example in which file name setting processing control that is different from that of the previously described first embodiment is performed. In the second embodiment, a naming rule is saved without executing item check processing (step S1802) in the file naming rule setting processing of FIG. 18.

Figure 19:
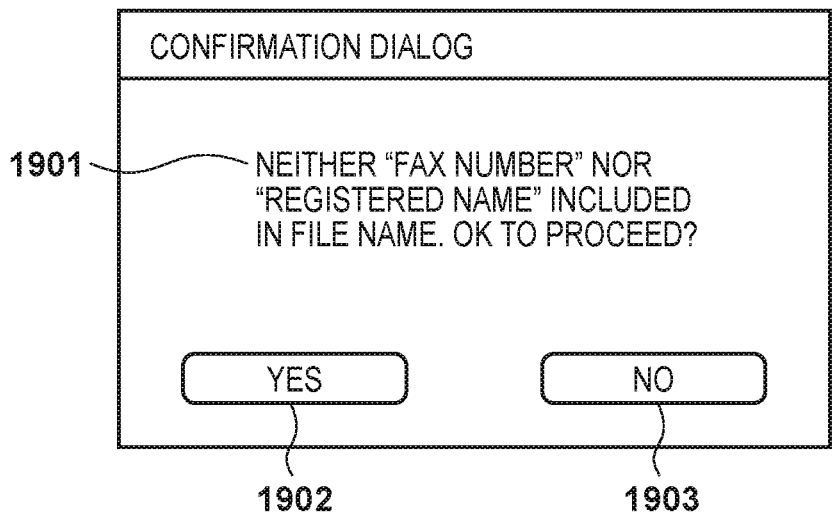
FIG. 19 depicts a view illustrating an example of a confirmation dialog displayed by the MFP according to a second embodiment of the present invention.

FIG. 19 depicts a view illustrating an example of a confirmation dialog displayed by the MFP 110 according to the second embodiment of the present invention. Note that the configurations of the MFP 110 and the file server 120, and the system configuration according to the second embodiment, are the same as those in the previously described first embodiment, and so explanation thereof will be omitted.

A message 1901 shows a message displayed in this confirmation dialog. A YES button 1902 is pressed when a user acknowledges display content in this confirmation dialog. If the user presses the YES button 1902, transition is made to the previously explained folder naming rule setting screen shown in FIG. 11, for example. A NO button 1903 is designated when a user does not acknowledge display content in this confirmation dialog. If the user presses the NO button 1903, transition is made to the file naming rule setting screen of FIG. 10, for example.

Figures 20, 21:
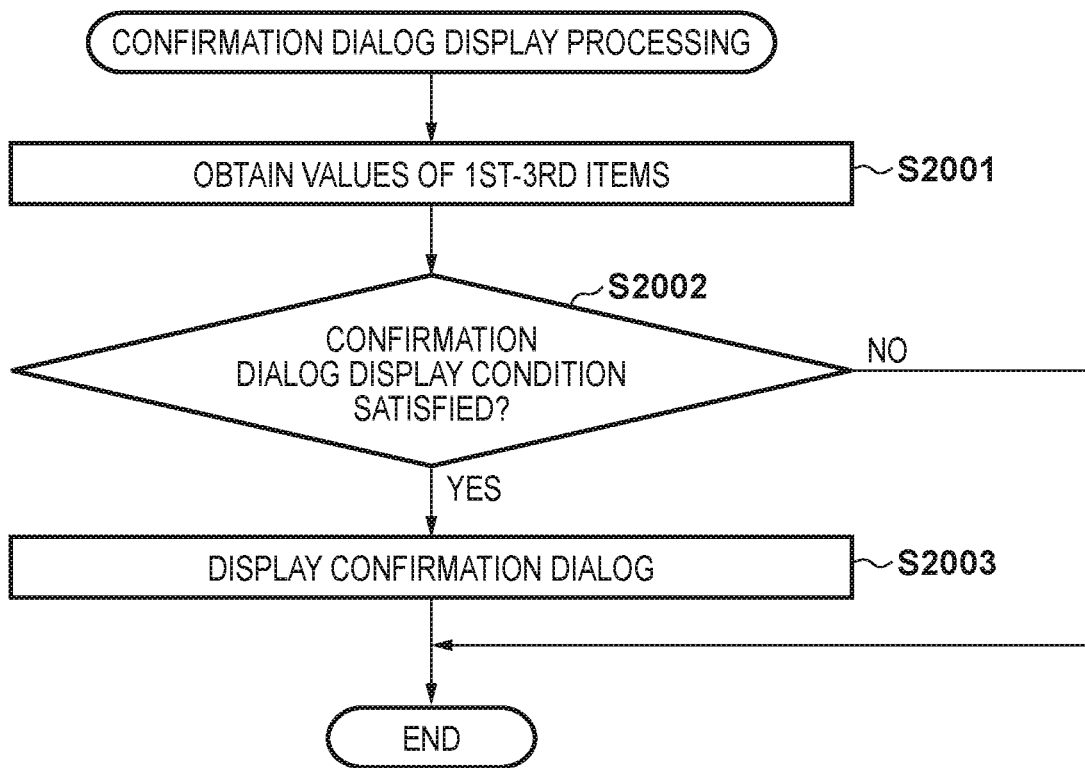
FIG. 20 is a flowchart for describing confirmation dialog display processing by the MFP according to the second embodiment.
FIG. 21 depicts a view illustrating an example of transfer setting information according to the second embodiment.

FIG. 20 is a flowchart for describing confirmation dialog display processing by the MFP 110 according to the second embodiment. Note that the operations shown in this flowchart are realized by the CPU 201 of the MFP 110 deploying a control program stored in the HDD 204 into the RAM 203 and executing the control program, and the performer of these operations is explained as the CPU 201. The processing illustrated by the flowchart is executed when the folder naming rule setting screen is displayed in step S1309 of FIG. 13.

Firstly, in step S2001, the CPU 201 obtains information of the filenamerule 705 saved in the transfer setting information (FIG. 7). Next, the processing proceeds to step S2002, and the CPU 201 determines whether or not the display condition of the confirmation dialog is satisfied based on the naming rule obtained in step S2001. Here explanation will be given for details of the display condition for the confirmation dialog using transfer setting information.

FIG. 21 depicts a view illustrating an example of transfer setting information according to the second embodiment. In FIG. 21, reference numerals 2101-2106 are the same as the transfer setting information items 701-706 of FIG. 7 in accordance with the previously described first embodiment, and so explanation thereof will be omitted.

A dialogrule 2107 shows a condition for displaying the confirmation dialog. This condition is designated when a confirmation dialog display setting screen (not shown) for designating the condition is displayed via the UI module 406, or when a Web browser displaying a confirmation dialog display setting screen (not shown) for designating the condition. In the dialogrule 2107, it is possible to designate "registered name", "fax number", "date", "destination table name", "line name", "serial number", "random number" or the like. In FIG. 21, [REGISTEREDNAME] (registered name) and [FAXNUMBER] (fax number) are designated, and if these are not included in the filenamerule 2105, a confirmation dialog matching the above-described condition is displayed.

If, in step S2002 of FIG. 20, the CPU 201 determines that the display condition of the confirmation dialog is satisfied, the processing proceeds to step S2003, a confirmation dialog as shown in FIG. 19, for example, is displayed, and the processing completes. Meanwhile, if, in step S2002, the CPU 201 determines that the display condition is not satisfied, the processing completes without displaying the confirmation dialog.

By the second embodiment, as explained above, it is possible to arrange restrictions of later processing (displaying the confirmation dialog in the second embodiment) by designating a particular condition. Accordingly, by setting conditions that are confirmed by the user in accordance with the cooperating system and apparatus, for example, it is possible to improve the convenience of the user because it is possible to execute processing in accordance with the system or the apparatus.

Third Embodiment

In the previously described first embodiment, the folder naming rule is set via the folder naming rule setting screen shown in FIG. 11, for example. In the third embodiment, explanation is given for an example in which the folder naming rule is set via a setting screen that is different to that of the previously described first embodiment. Note that the configurations of the MFP 110 and the file server 120, and the system configuration according to the third embodiment, are the same as those in the previously described first embodiment, and so explanation thereof will be omitted.

FIG. 22 depicts a view illustrating an example of a folder naming rule setting screen displayed by the MFP 110 according to the third embodiment of the present invention. This screen is displayed as the folder naming rule setting screen displayed to the console unit 111 in step S1306 of FIG. 13, and the folder name is determined when transferring to the file server 120 in accordance with the folder naming rule set on this screen.

Reference numerals 2201-2203 of FIG. 22 show folder naming rule choices, and the one naming rule that is checked amongst these is applied as the folder naming rule. When a naming rule 2201 is selected, the folder name comprising "registered name/fax number/date" is generated. When a naming rule 2202 is selected, the folder name comprising "date/registered name/fax number" is generated. Also, when a naming rule 2203 is selected, a folder name comprising "fax number/registered name/date" is generated.

A cancel button 2204 indicates that the processing via this screen be cancelled. When a user presses the cancel button 2204, transition is made to the status display screen shown in FIG. 8, for example. A return button 2205 instructs that the previous screen be returned to. When the user presses the return button 2205, transition is made to the file naming rule setting screen shown in FIG. 10, for example. Also, a next button 2206 indicates that the next screen be proceeded to. If the user presses the next button 2206, transition is made to the transmission test screen shown in FIG. 12, for example.

The folder naming rule setting screen shown in FIG. 19 is used in place of the folder naming rule setting screen of FIG. 11 in the first embodiment in the transfer setting processing shown in the flowchart of previously explained FIG. 13. Then, in step S1309, the folder naming rule setting screen shown in FIG. 22 is displayed. Then, in step S1310, it is determined which button the user pressed in the folder naming rule setting screen. If the user presses the next button 2206, the processing proceeds to step S1311. If the user presses the cancel button 2204, the processing proceeds to step S1301. If the user presses the return button 2205, the processing proceeds to step S1306. In step S1311, the CPU 201 stores the information input on the folder naming rule setting screen of FIG. 22 to the HDD 204.

As explained above, by virtue of the third embodiment, it is possible to achieve the same effect as in the first embodiment. Also there is the effect that the operation of the user becomes simpler because, upon setting the folder name, it is possible for the user to set a desired naming rule by selecting the naming rule from out of folder naming rules determined in advance. With this, it is possible to more simply set the folder in which to store the received fax document.

OTHER EMBODIMENTS

In the first embodiment, it is possible to designate the registered name, the telephone number, and the date as the folder name, but configuration may be taken such that, for example, it is possible to designate a line number as the folder name in a case where there are two fax line connections to the modem 210 of the MFP 110.

In the above-described first through third embodiments, setting is performed using a plurality of screens in which setting screens are in a wizard format, but configuration may be taken such that everything can be set on a single screen.

Also, in the above-described first through third embodiments, by displaying setting screens on the console unit 111, the user is allowed to operate by controlling the console unit 111 of the MFP 110, but configuration may be taken such that it is possible to operate the setting screen from a Web browser on a general-purpose personal computer.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus, comprising:
   at least one processor; and
   at least one memory having stored thereon instructions which, when executed by the at least one processor, cause the information processing apparatus to:
   display a setting screen for setting a naming rule;
   allow a user to select items as the naming rule in the displayed setting screen, wherein the naming rule is used for automatically generating a file name of a file;
   determine whether or not the selected items satisfy a predetermined condition;
   give a user a warning that the selected items should include a predetermined item in a case where it is determined that the selected items do not satisfy the predetermined condition;
   store the selected items as the naming rule after it is determined that the selected items satisfy the predetermined condition; and
   automatically generate a file name of a file in accordance with the selected items stored as the naming rule.

2. The information processing apparatus according to claim 1, wherein the predetermined condition is a condition that the selected items include the predetermined item by which the file name will be generated uniquely.

3. The information processing apparatus according to claim 2, wherein the selected items are not stored as the naming rule in a case where it is determined that the selected items do not include the predetermined item.

4. The information processing apparatus according to claim 1, wherein, when the information processing apparatus receives image data, the file name of a file corresponding to the received image data is automatically generated in accordance with the selected items stored as the naming rule.

5. The information processing apparatus according to claim 4, wherein the image data is facsimile data.

6. The information processing apparatus according to claim 1, wherein the user is allowed to select, in the displayed setting screen, the items from among a received date time of the file, destination information of a transmission source, a line name, a serial number, and a random number.

7. The information processing apparatus according to claim 1, wherein the user is allowed to further select, in the displayed setting screen, a separator indicating a separation of designated items.

8. The information processing apparatus according to claim 7, wherein the instructions, when executed by the at least one processor, further cause the information processing apparatus to display, in the setting screen, a preview that displays what the file name will be like in accordance with the selected items and the selected separator.

9. The information processing apparatus according to claim 1, wherein the predetermined item is at least one of a received date time, a serial number, and a random number.

10. The information processing apparatus according to claim 1, wherein the instructions, when executed by the at least one processor, further cause the information processing apparatus to control so that the file and the automatically generated file name are transmitted to a server and stored in the server.

11. The information processing apparatus according to claim 1, wherein the instructions, when executed by the at least one processor, further cause the information processing apparatus to:
display a second setting screen for setting a folder naming rule; and
allow the user to select at least one second item as the folder naming rule in the displayed second setting screen, wherein the folder naming rule is used for automatically generating a folder path of a folder that stores the file.

12. The information processing apparatus according to claim 11, wherein the user is allowed to select, in the displayed second setting screen, the at least one second item from a received date, destination information of a transmission source, and a line name.

13. A method of controlling an information processing apparatus, the method comprising:
displaying a setting screen for setting a naming rule;
allowing a user to select items as the naming rule in the displayed setting screen, wherein the naming rule is used for automatically generating a file name of a file;
determining whether or not the selected items satisfy a predetermined condition;
giving a user a warning that the selected items should include a predetermined item in a case where it is determined that the selected items do not satisfy the predetermined condition;
storing the selected items as the naming rule after it is determined that the selected items satisfy the predetermined condition; and
automatically generating a file name of a file in accordance with the selected items stored as the naming rule.

14. A non-transitory computer-readable storage medium storing a program for causing a computer to:

display a setting screen for setting a naming rule;
allow a user to select items as the naming rule in the displayed setting screen, wherein the naming rule is used for automatically generating a file name of a file;
determine whether or not the selected items satisfy a predetermined condition;
give a user a warning that the selected items should include a predetermined item in a case where it is determined that the selected items do not satisfy the predetermined condition;
store the selected items as the naming rule after it is determined that the selected items satisfy the predetermined condition; and
automatically generate a file name of a file in accordance with the selected items stored as the naming rule.

15. The non-transitory computer-readable storage medium according to claim 14, wherein the program further causes the computer to determine whether or not the selected items include the predetermined item, and
wherein the predetermined condition is a condition that the selected items include the predetermined item by which the file name will be generated uniquely.

16. The non-transitory computer-readable storage medium according to claim 14, wherein, in response to receiving image data, the file name of the file corresponding to the received image data is automatically generated in accordance with the selected items stored as the naming rule.

17. The non-transitory computer-readable storage medium according to claim 14, wherein the program further causes the computer to allow the user to further select, in the displayed setting screen, a separator indicating a separation of designated items.

18. The non-transitory computer-readable storage medium according to claim 17, wherein the program further causes the computer to display, in the setting screen, a preview that displays what the file name will be like in accordance with the selected items and the selected separator.

19. The non-transitory computer-readable storage medium according to claim 14, wherein the predetermined item is at least one of a received date time, a serial number, and a random number.

20. The non-transitory computer-readable storage medium according to claim 14, wherein the program further causes the computer to:
display a second setting screen for setting a folder naming rule; and
allow the user to select at least one second item as the folder naming rule in the displayed second setting screen, wherein the folder naming rule will be used for automatically generating a folder path of a folder that stores the file.

* * * * *